US011636758B2

(12) United States Patent
Dutta et al.

(10) Patent No.: US 11,636,758 B2
(45) Date of Patent: *Apr. 25, 2023

(54) IDENTIFYING CHANGES IN THE CONDITION OF A TRANSPORT

(71) Applicant: TOYOTA MOTOR NORTH AMERICA, INC., Plano, TX (US)

(72) Inventors: Neil Dutta, Addison, TX (US); Anil Nagpal, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,401

(22) Filed: Jan. 18, 2022

(65) Prior Publication Data

US 2022/0139210 A1    May 5, 2022

Related U.S. Application Data

(63) Continuation of application No. 16/443,936, filed on Jun. 18, 2019, now Pat. No. 11,227,490.

(51) Int. Cl.
*G08G 1/017* (2006.01)
*G08G 1/0967* (2006.01)
*G08G 1/16* (2006.01)

(52) U.S. Cl.
CPC ....... *G08G 1/017* (2013.01); *G08G 1/096758* (2013.01); *G08G 1/096775* (2013.01); *G08G 1/161* (2013.01); *G08G 1/166* (2013.01)

(58) Field of Classification Search
CPC ............ G08G 1/017; G08G 1/096758; G08G 1/096775; G08G 1/161; G08G 1/166; G08G 1/202; G08G 1/205; G06Q 50/30; G06Q 10/20
See application file for complete search history.

(56) References Cited

U.S. PATENT DOCUMENTS

| 5,684,701 | A  | 11/1997 | Breed |
| 6,023,664 | A  | 2/2000  | Bennet |
| 6,052,631 | A  | 4/2000  | Busch et al. |
| 6,070,113 | A  | 5/2000  | White et al. |
| 6,850,843 | B2 | 2/2005  | Smith et al. |
| 7,202,776 | B2 | 4/2007  | Breed |
| 7,284,769 | B2 | 10/2007 | Breed |
| 7,348,895 | B2 | 3/2008  | Lagassey |

(Continued)

FOREIGN PATENT DOCUMENTS

WO   2020234089 A1   11/2020

OTHER PUBLICATIONS

Huetter, "Uveye tech can eyeball vehicles in 3-D, detect auto body damage, hidden threats," [online] Repairer Driven News, published on Dec. 11, 2018, available at: < https://www.repairerdrivennews.com/2018/12/11/uveye-tech-can-eyeball-vehicles-in-3-d-detect-auto-body-damage-hidden-threats/ > (Year: 2018).

*Primary Examiner* — Sisay Yacob

(57) ABSTRACT

An example operation may include one or more of identifying a new condition of a transport during a transport event based on sensor data, retrieving a transport condition profile, comparing the new condition to an initial condition of the transport, stored prior to the transport event, in the transport condition profile, and determining the transport is damaged based on the comparing.

20 Claims, 17 Drawing Sheets

(56) References Cited

U.S. PATENT DOCUMENTS

| | | |
|---|---|---|
| 7,359,821 B1 | 4/2008 | Smith et al. |
| 7,527,288 B2 | 5/2009 | Breed |
| 7,725,334 B2 | 5/2010 | Wahlbin et al. |
| 7,805,321 B2 | 9/2010 | Wahlbin et al. |
| 7,840,355 B2 | 11/2010 | Breed et al. |
| 7,889,931 B2 | 2/2011 | Webb et al. |
| 7,899,621 B2 | 3/2011 | Breed et al. |
| 7,983,835 B2 | 7/2011 | Lagassey |
| 7,986,843 B2 | 7/2011 | Chaudhury et al. |
| 8,019,629 B1 | 9/2011 | Medina et al. |
| 8,024,084 B2 | 9/2011 | Breed |
| 8,050,863 B2 | 11/2011 | Trepagnier et al. |
| 8,054,168 B2 | 11/2011 | McCormick et al. |
| 8,244,309 B2 | 8/2012 | Marumoto |
| 8,384,539 B2 | 2/2013 | Denny et al. |
| 8,799,034 B1 | 8/2014 | Brandmaier et al. |
| 8,799,036 B1 | 8/2014 | Christensen et al. |
| 8,836,784 B2 | 9/2014 | Erhardt et al. |
| 8,954,226 B1 | 2/2015 | Binion et al. |
| 8,971,587 B2 | 3/2015 | Macciola et al. |
| 9,053,516 B2 | 6/2015 | Stempora |
| 9,083,581 B1 | 7/2015 | Addepalli et al. |
| 9,137,417 B2 | 9/2015 | Macciola et al. |
| 9,218,698 B2 | 12/2015 | Ricci |
| 9,262,787 B2 | 2/2016 | Binion et al. |
| 9,430,189 B2 | 8/2016 | Soles et al. |
| 9,491,420 B2 | 11/2016 | Mimar |
| 9,558,520 B2 | 1/2017 | Peak et al. |
| 9,595,184 B2 | 3/2017 | Almansour |
| 9,628,975 B1 | 4/2017 | Watkins et al. |
| 9,721,400 B1 | 8/2017 | Oakes, I et al. |
| 9,805,423 B1 | 10/2017 | Konrardy et al. |
| 9,886,771 B1 | 2/2018 | Chen et al. |
| 9,892,567 B2 | 2/2018 | Binion et al. |
| 9,916,625 B2 | 3/2018 | Lehman et al. |
| 9,972,054 B1 | 5/2018 | Konrardy et al. |
| 10,137,889 B2 | 11/2018 | Pal et al. |
| 10,185,997 B1 | 1/2019 | Konrardy et al. |
| 10,185,998 B1 | 1/2019 | Konrardy et al. |
| 10,217,168 B2 | 2/2019 | Tofte et al. |
| 10,284,654 B2 | 5/2019 | Alvarez et al. |
| 10,304,137 B1 | 5/2019 | Genser et al. |
| 10,354,230 B1 * | 7/2019 | Hanson .................. G07B 15/00 |
| 10,373,265 B1 | 8/2019 | Konrardy et al. |
| 10,399,523 B1 * | 9/2019 | Christensen ............ H04W 4/90 |
| 10,403,147 B2 | 9/2019 | Hyde et al. |
| 10,521,865 B1 | 12/2019 | Spader et al. |
| 2002/0186144 A1 | 12/2002 | Meunier |
| 2004/0240542 A1 | 12/2004 | Yeredor et al. |
| 2005/0207585 A1 | 9/2005 | Christoph |
| 2007/0109111 A1 | 5/2007 | Breed et al. |
| 2007/0250232 A1 | 10/2007 | Dourney et al. |
| 2008/0086349 A1 | 4/2008 | Petrie |
| 2008/0239077 A1 | 10/2008 | Kurylo |
| 2009/0088916 A1 | 4/2009 | Elgersma et al. |
| 2009/0259717 A1 | 10/2009 | Kreiner et al. |
| 2009/0265193 A1 | 10/2009 | Collins et al. |
| 2010/0299021 A1 | 11/2010 | Jalili |
| 2011/0218825 A1 | 9/2011 | Hertenstein |
| 2012/0083947 A1 | 4/2012 | Anderson et al. |
| 2012/0264376 A1 | 10/2012 | Breed |
| 2013/0246301 A1 | 9/2013 | Radhakrishnan et al. |
| 2013/0297353 A1 | 11/2013 | Strange et al. |
| 2014/0149156 A1 | 5/2014 | Schroeder |
| 2014/0201022 A1 | 7/2014 | Balzer |
| 2014/0229123 A1 | 8/2014 | Smith et al. |
| 2014/0257627 A1 | 9/2014 | Hagan |
| 2014/0278571 A1 | 9/2014 | Mullen et al. |
| 2014/0309805 A1 * | 10/2014 | Ricci .................... G06F 16/951 |
| | | 701/1 |
| 2015/0112504 A1 | 4/2015 | Binion et al. |
| 2015/0127191 A1 | 5/2015 | Misra et al. |
| 2015/0206206 A1 | 7/2015 | Puente et al. |
| 2015/0245167 A1 | 8/2015 | Bobrow et al. |
| 2015/0287130 A1 * | 10/2015 | Vercollone ........... G06V 10/235 |
| | | 705/34 |
| 2015/0308927 A1 | 10/2015 | Kono |
| 2015/0371153 A1 | 12/2015 | Lohmeier et al. |
| 2016/0182707 A1 | 6/2016 | Gabel |
| 2016/0277911 A1 | 9/2016 | Kang et al. |
| 2017/0148235 A1 * | 5/2017 | Yakub .................... G07C 5/008 |
| 2017/0200321 A1 | 7/2017 | Hummel et al. |
| 2017/0278194 A1 * | 9/2017 | MacNeille ......... B60G 17/0185 |
| 2017/0291539 A1 | 10/2017 | Avery |
| 2018/0089605 A1 | 3/2018 | Poomachandran et al. |
| 2018/0102051 A1 | 4/2018 | Suthar |
| 2018/0202822 A1 | 7/2018 | DeLizio |
| 2018/0260886 A1 | 9/2018 | Buttolo et al. |
| 2018/0286145 A1 * | 10/2018 | Lindelöf ................ B60K 28/02 |
| 2019/0190980 A1 | 6/2019 | Penilla et al. |
| 2019/0259093 A1 | 8/2019 | Turato |
| 2020/0104778 A1 | 4/2020 | Tiderington |
| 2020/0286162 A1 | 9/2020 | Liu et al. |

\* cited by examiner

550

IDENTIFYING CHANGES IN THE CONDITION OF A TRANSPORT

CROSS-REFERENCE TO RELATED APPLICATIONS

This application is a continuation of U.S. patent application Ser. No. 16/443,936, filed on Jun. 18, 2019, now U.S. Pat. No. 11,227,490, issued on Jan. 18, 2022, the entire disclosure of which is incorporated by reference herein.

TECHNICAL FIELD

This application generally relates to identifying changes with certain objects, and more particularly, to identifying changes in the condition of a transport.

BACKGROUND

Vehicles or transports, such as cars, motorcycles, trucks, planes, trains, etc., are generally providing transportation needs to various occupants in a variety of ways. For example, a car or van can provide a taxi service, whether an automated transport or user operated transport. Users may operate their handheld computing devices to select a transport for a ride to a particular destination. Transports may be identified and controlled by computing devices, such as a computer that controls the vehicle itself and/or via a controller device, such as a smartphone or a computer managed by a vehicle operator.

Users of vehicles may be from all walks of life. The users may be young, middle-aged or old and may also be inclined to treat rented vehicles differently. Tracking and monitoring the conditions of rented objects is currently performed by a user and is not comprehensive given the lack of time associated with such tasks, and the limited resources available. All such reviews or checks are subject to human error and may lead to disagreement between the user renting the vehicle and the user confirming the results of the vehicle. In more recent times, the modern vehicle sharing model includes various transports, such as scooters, bicycles and automobiles which are rented and returned to locations which are selected by the renter and which have no reviewer present to identify the condition of the vehicle.

SUMMARY

One example embodiment may provide a system that includes one or more of a transport associated with at least one sensor, and a server communicably coupled to at least one sensor and the server is configured to perform one or more of receive first data from the at least one sensor wherein the first data contains at least one condition of the transport, receive a second data from the server wherein the second data contains at least one review of a user, determine a rating of the user based on the first data and the second data, receive a query from another server that relates to the rating of the user, send a response that contains the rating, and perform an action, by the another server, based on the rating.

Another example embodiment may include a method that includes one or more of receiving, at a server, first data from at least one sensor associated with a transport wherein the first data contains at least one condition of the transport, receiving a second data from the server wherein the second data contains at least one review of a user, determining a rating of the user based on the first data and the second data, receiving a query from another server relating to the rating of the user, sending a response containing the rating, and performing an action, by the another server, based on the rating.

Still another example embodiment may include a non-transitory computer readable medium comprising instructions, that when read by a processor, cause the processor to perform one or more of receiving, at a server, first data from at least one sensor associated with a transport wherein the first data contains at least one condition of the transport, receiving a second data from the server wherein the second data contains at least one review of a user, determining a rating of the user based on the first data and the second data, receiving a query from another server relating to the rating of the user, sending a response containing the rating, and performing an action, by the another server, based on the rating.

Still yet a further example embodiment may include a system that includes a transport associated with at least one sensor, and a server communicably coupled to at least one sensor and the server is configured to perform one or more of identify a new condition of the transport at the time of a transport event based on data from the at least one sensor, retrieve a transport condition profile, compare the new condition to an initial condition of the transport, stored prior to the transport event, in the transport condition profile, and determine the transport is damaged based on the compare.

Still yet another example embodiment may include a method that includes one or more of identifying a new condition of a transport during a transport event based on sensor data, retrieving a transport condition profile, comparing the new condition to an initial condition of the transport, stored prior to the transport event, in the transport condition profile, and determining the transport is damaged based on the comparing.

Still yet another example embodiment may include a non-transitory computer readable medium comprising instructions, that when read by a processor, cause the processor to perform one or more of identifying a new condition of a transport during a transport event based on sensor data, retrieving a transport condition profile, comparing the new condition to an initial condition of the transport, stored prior to the transport event, in the transport condition profile, and determining the transport is damaged based on the comparing.

DETAILED DESCRIPTION

Figure 1A:
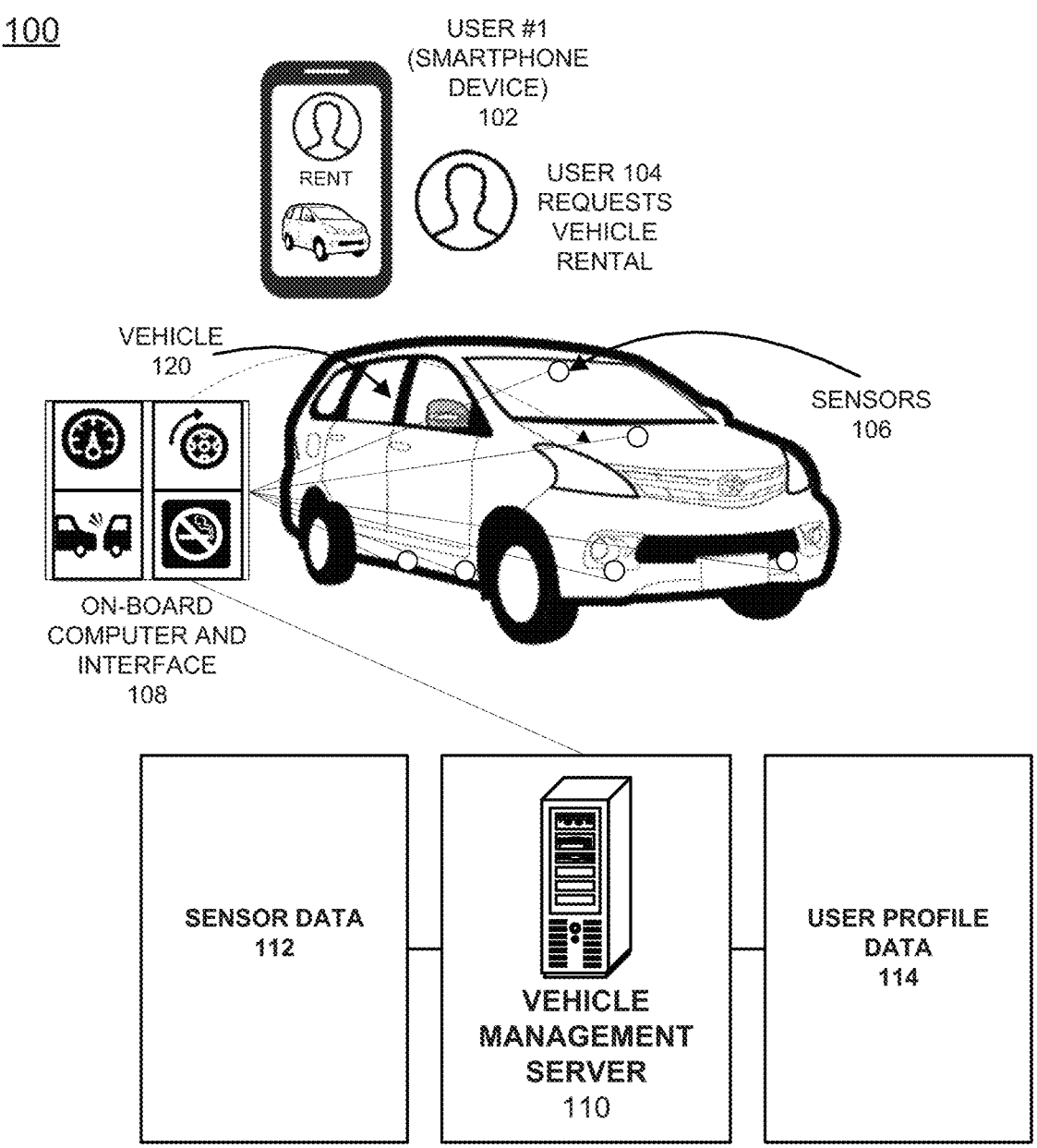
FIG. 1A illustrates a network diagram of a transport request and monitoring configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and/or goods from one location to another.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a verification system, and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. For example, a user profile may be applied to a particular transport/vehicle to monitor the current vehicle event and to authorize subsequent vehicle rental services.

The status of the condition of a transport upon return may be favorable or unfavorable. For example, a transport may be returned in a condition that is worse than when the transport was initially rented. For example, the transport may have a scratch, a dent, show excessive wear, have excessive mileage, have excessive wear on one or more tires, have excessive wear on the shocks and/or suspension, have damage to the interior such as stains, cuts, bruises, have an odor reflecting interior smoking, have moisture damage on the interior, and/or other similar conditions. The transport may also be returned in a condition that is favorable and reflect positively for the renter of the transport. For example, the transport may be returned with more fuel and/or battery charge than was promised, the exterior and interior of the transport may be washed and cleaned, the amount of mileage may be lower than the normal mileage used for the rental period (given the average mileage per area, time of day, etc.), and/or other similar conditions.

In other embodiments, sensors are on the transport that are used to detect moisture in the seats, wherein one or more seats have a sensor inside the seat to detect moisture. Analysis of the sensor data may show that although the seat visually appears normal, it is possible to detect that the seat had moisture, as well as determine the approximate amount of moisture, such as when one or more windows were left down during a rain storm for example. Other examples of sensors in the interior of the transport may also be present, such as chemical sensors, air quality sensors, pressure sensors, and/or flex sensors.

In another embodiment, the sensor may be Global Positioning Satellite (GPS) functionality in the transport or a device associated with the transport wherein historical data may be used to determine the route of the transport.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permission-less blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for offering a vehicle service to a particular requesting user profile, applying the user profile to the vehicle when, monitoring vehicle status information during the event, such as a rental period of time prior to the event ending. The interaction with a sensor may be used in the current application. A sensor may be located on one or more of the interior of the transport, the exterior of the transport, on a fixed object apart from the transport, and on another transport. The sensor may also be associated with the transport's speed, the transport's braking, the transport's acceleration, the gear-shifting of the transport, the transport's steering, and the like. The notion of a sensor may also be a device, such as a mobile device, that is used to capture the condition of the transport wherein images are obtained. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

The instant application includes collecting vehicle event data via corresponding sensors and associated computer controllers that are configured to share relevant data that is likely to detect/avoid dangerous conditions, identify potential damage the vehicle and assist third parties with identifying those parties to certain vehicle events. Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates a network diagram of a transport request and monitoring configuration, according to example embodiments. Referring to FIG. 1A, the network diagram 100 includes a user 104 accessing a user device 102 to request access to a vehicle 120, such as for a rental service. The vehicle 120 may be a rented, owned, partially owned (i.e., subject to other owners), autonomously driven by a non-present driver, semi-autonomously driven by a driver or driven by a conventional manual vehicle operator. The vehicle 120 may accept the user request sent from the user device 102 as managed by a vehicle management server 110, which receives the request, identifies an available vehicle 120 and creates a new transport event. The server 110 may identify the user profile for the user 104 and may then apply the user profile to the vehicle 120 prior to an upcoming vehicle event. The vehicle 120 may have a set of features and services available to the occupants, however, the user profile of the requesting entity may require certain features be limited to only a sub-set of those features given a user preferences. Also, certain requirements may be necessary, such as child safety measures prior to the vehicle being selected for pick-up and drop-off of the user 104 assuming children are going to ride in the vehicle as well.

Any of the vehicles identified as potential vehicles for the requested event may include sensors 106 on any portion of the interior and/or exterior of the vehicle 120. The sensors 106 may be hardwired to a central controller, or on-board computer 108, or other processor associated with the vehicle, or may instead be providing wireless communications with the central controller of the vehicle's computer 108 via various wireless communication protocols. The data may be transmitted from the central controller/computer, a user's smartphone 102, and/or via a cellular compatible device, etc. The sensor content and different sensor data types may include one or more of a radio station selection, recorded audio, mobile device usage within the vehicle, telephone calls conducted inside the vehicle, browser history of at least one of the computing devices, purchases conducted via at least one computing device inside the vehicle, movement of the vehicle, navigation of the vehicle, a collision of the vehicle, speed of the transport, acceleration of the vehicle, diagnostics associated with the transport including battery charge level, gasoline level, oil level, temperature of the vehicle, location of the vehicle, detected traffic near the vehicle, information regarding other vehicles, etc. The sensor data 112 may be collected and stored for analysis and transaction recording.

The types of sensors which may be included with the vehicles may include one or more of movement sensors, sonar sensors, lidar sensors, accelerometers, touch sensors, proximity sensors, temperature sensors, speed sensors, sound sensors, infrared sensors, collision sensors, level sensors, tire pressure sensors, location determination sensors, ultrasonic sensors, camera sensors, activity sensors, chemical sensors, fluid sensors, pressure sensors, optical sensors and biometric sensors.

In operation, when a user 104 successfully rents a vehicle via their smartphone or other computing device 102, the information associated with the user's profile may include a current score or other value that indicates the user's profile rating. For example, if a user 104 has performed renting of a transport, wherein a transport may be cars, trucks, motorcycles, scooters, bicycles, boats, recreational vehicles, etc., or even residences, such as short term rental properties and other properties, then the user may have been reviewed by one or more owners or managers of those items rented. Such a rating can be affected by reviews which may be performed after the rental period to indicate a relative degree of care, cleanliness, damage, etc., the user may be responsible for having caused to the property during the rental period. In order to automate and optimize the post-event review process, various vehicle sensors 106 may be used both inside and outside the vehicle 120 to provide data about the condition of the vehicle 120 to a centralized computing entity, such as the on-board computer 108. The sensors may identify, collisions, acceleration rates, velocity rates, excessive jarring/off-road type movements, among other sensor data types of sensor information. Such information may be retrieved, stored in temporary sensor data profiles and analyzed either immediately for determinations regarding vehicle status and/or at a later time to ascertain whether certain damages to the vehicle can be identified.

After the vehicle event, the vehicle 120 may be scanned by a laser perimeter scanner, an infrared scanner, etc., which creates a vector image orientation of the vehicle and determines whether damages have been made to the inside and/or outside of the vehicle 120. The image data scanned can be compared to image data retrieved prior to the rental event. The comparison data can be obtained by comparing the new image data to the previously obtained image data. A deviation between the two sets of images can be used to determine when damage has occurred based on a depression threshold used to judge whether slight changes in the body of the vehicle are actually damaged or not. For example, a deviation may identify a change caused by the recent vehicle event, however, the depression threshold may require a certain image data depth measurement prior to declaring damage to the vehicle. For example, the depression threshold may require 'X' mm of depth detection from a first image profile (measured prior to the event) to a second image profile (measured after the event) prior to declaring the damage to the vehicle.

Other sensor data may be identified and used to declare the vehicle use unsafe, excessive and/or punishable by a rating degradation (poor review), and/or a fine for misuse. For example, a vehicle tire may be measured by a scan detection system to identify excessive tire spinning or misuse as another measure of vehicle damage. Another example may be sensor data indicating excessive acceleration and/or braking as a measure of vehicle misuse. Such data is logged in the temporary vehicle profile and used to make decisions about what type of automated review to generate on behalf of the user after the event is complete, and whether to deduct points from a score (e.g., minus 10 off of a 100 potential score, minus two stars from five potential stars, etc.). Also, a determination is made as to whether to penalize the user profile with a fine. In some instances, certain sensor data may yield a deduction in a user rating, however, such deductions may be minor and may not incur a fine, such as an excessive amount of acceleration detected over a period of time, however, no discernable damage is identified as being caused to the vehicle.

In another example, autonomous vehicles (unmanned vehicles) may be regulated where sensor data is mandated for various reasons since operation of the vehicle is controlled by a computer and not necessarily a person. As a result, the sharing of the sensor data gathered by autonomous vehicles may be required by various agencies and third parties to ensure safety measures. As noted previously, the vehicle 120 may be a vehicle operated by a human driver or an autonomous vehicle operated by a computer and/or remote agent designed for users to ride in during a transport event. The vehicle sensor data may be collected via a plurality of the vehicle sensors 106. The controller device (i.e., on-board computer and/or user smartphone, etc.) may identify the sensor type, sensor identifier and instances of sensor data received for those parameters. The collection of sensor data may create one or more sets of sensor data. For example, sensors S1, S2, S3 . . . Sn, may generate sensor data sets SD1, SD2, SD3 . . . SDn. Those sensor data sets may include multiple iterations of sensor data over a fixed period of time (e.g., milliseconds, seconds, minutes, hours, etc.) or short instances of extreme measurements, such as only instances of large deviations from expected values to identify, for example, an accident, a hole in the road, braking, extreme conditions or maneuvers, etc.

Owners of autonomous/non-autonomous vehicles (or occupants of the vehicles) may register their personal profiles in a shared ledger or other data management system so the information collected during sensor collection efforts may be shared and the owner's profile and/or vehicle may be credited with a predetermined value also identified in the shared ledger, via a smart contract. The smart contract may identify the parties of the agreement, permissions for vehicle occupants, types of data, current profile statuses, sensor thresholds associated with vehicle damages/liability, and other parameters. The immutability of the sensor data may also be preserved via the shared ledger format of a blockchain. The vehicle management server 110 may receive the sensor data 112 and/or the user profile data 114 to pair the detected conditions with the user profile for automated condition scores, user reviews, and modified user rating scores.

Figure 1B:
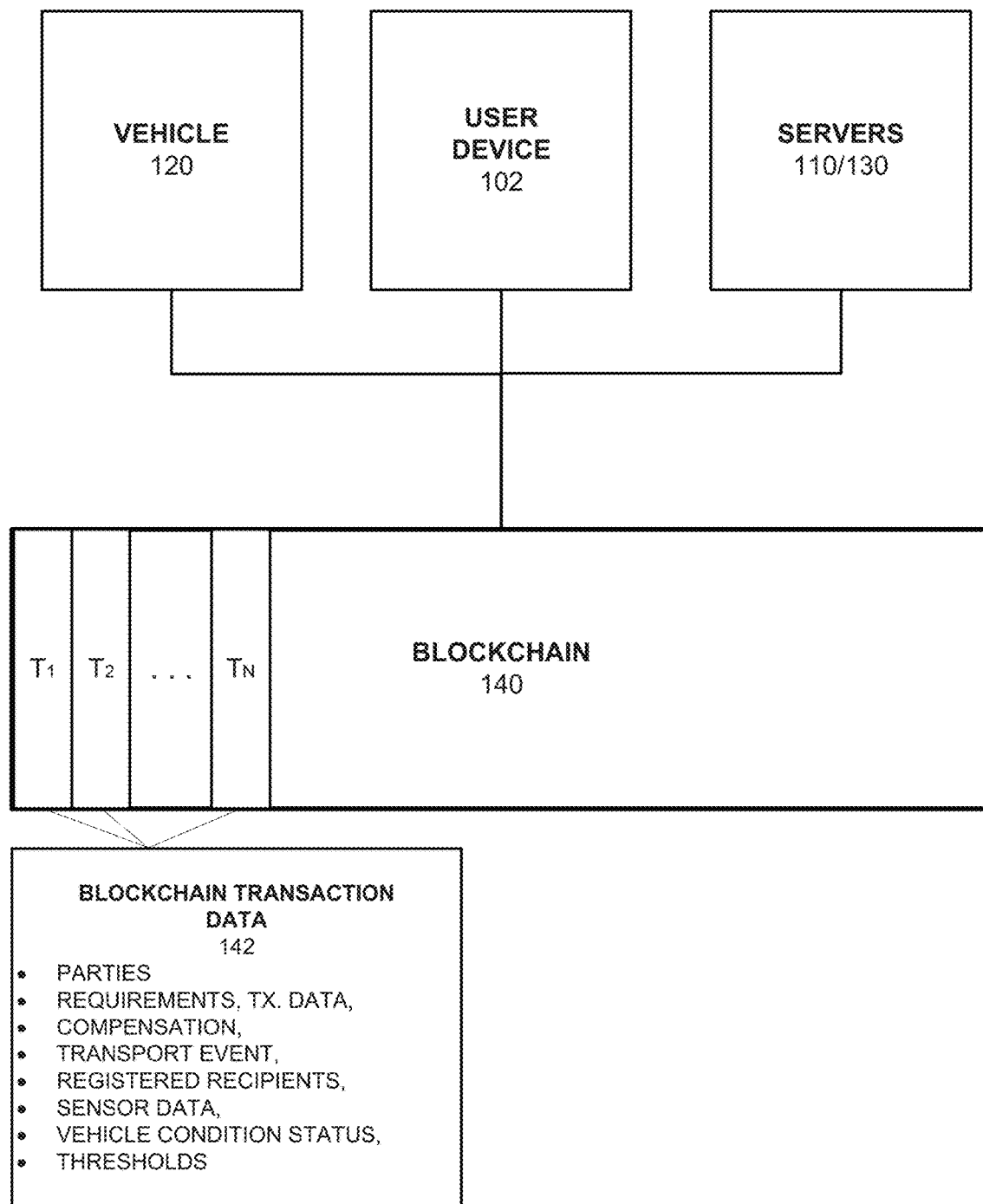
FIG. 1B illustrates a blockchain configuration for storing blockchain transaction data, according to example embodiments.

FIG. 1B illustrates a blockchain configuration for storing blockchain transaction data, according to example embodiments. Referring to FIG. 1B, the example configuration 150 provides for the vehicle 120, the user device 102 and the servers 110/130 sharing information with a distributed ledger (i.e., blockchain) 140. The servers may represent a service provider entity 130 inquiring with the vehicle service provider 110 to share user profile rating information in the event that a known and established user profile is attempting to rent a vehicle with an established rated profile. The second server 130 may be soliciting the first server 110 for user reputation information. As the events occur, such as the vehicle request, vehicle identification, user profile retrieval, user profile/access status identification, rules and permissions being applied to the vehicle, vehicle event sensor data collection, vehicle operational behavior monitoring, etc., a smart contract may be used to invoke rules, thresholds, sensor information gathering, etc., for the vehicle event. The blockchain transaction data 142 is saved for each transaction, such as the access event, the subsequent updates to a vehicle status, event condition updates, etc. The transactions may include the parties, the requirements (e.g., 18 years of age, legal guardian of occupant, valid driver's license, etc.), compensation levels, the distance traveled during the event, the registered recipients permitted to access the event, rights/permissions, sensor data retrieved during the event to log details of the event and identify a vehicle's condition status, and thresholds used to make determinations about whether the event was completed and whether the vehicle was damaged.

Figure 1C:
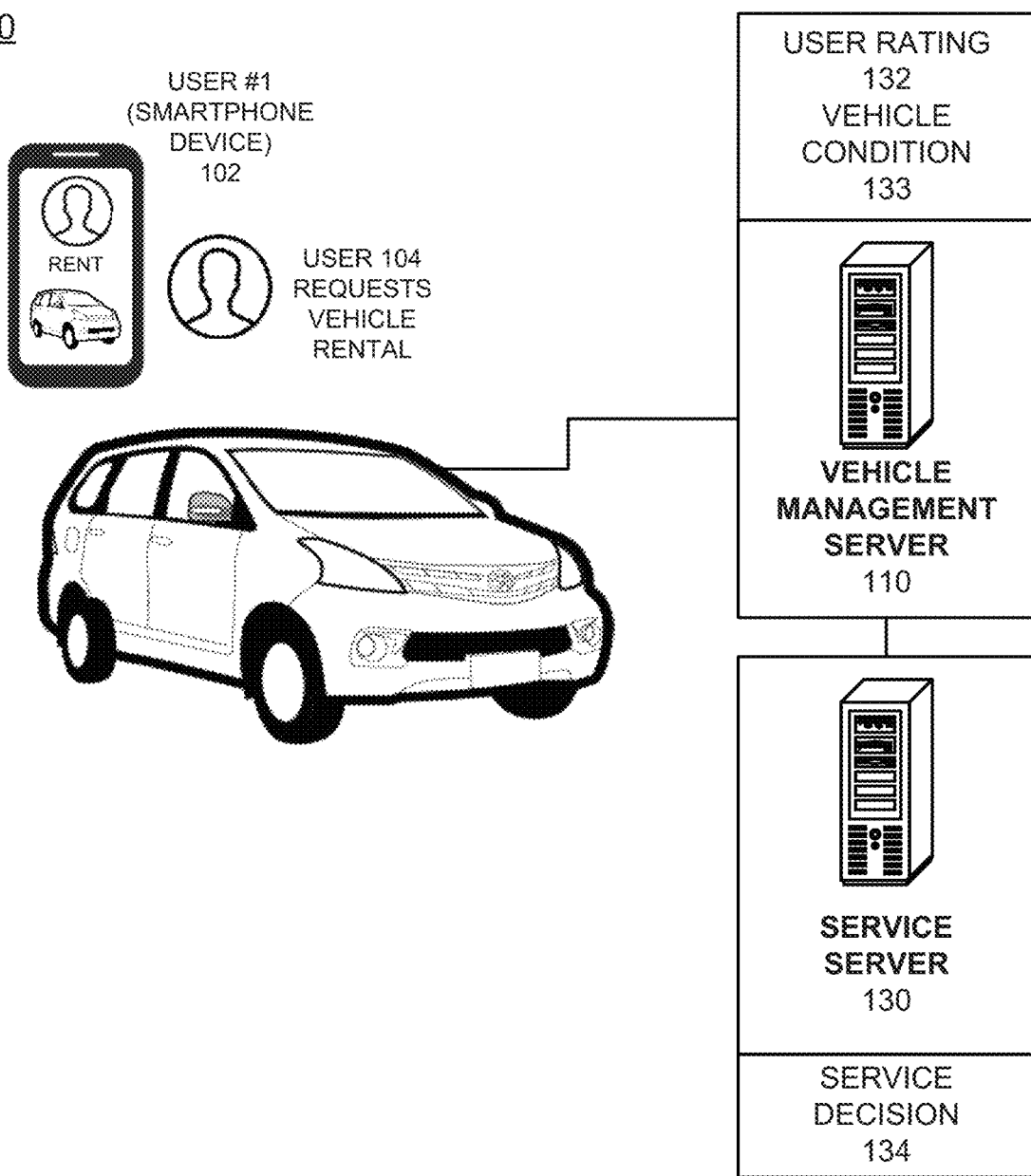
FIG. 1C illustrates a transport and user profile rating and decision procedure, according to example embodiments.

FIG. 1C illustrates a transport and user profile rating and decision procedure, according to example embodiments. Referring to FIG. 1C, the configuration 160 includes a user 104 requesting access to a vehicle rental service 104 via a smartphone 102. The vehicle management server 110 may store a user rating from a previous rental experience, such as another vehicle rental from a previous time. The user rating 132 may be a current rating that is applied to a next rental request to another service provider 130. The service decision 134 may be based on a query decision result sent from the current service provider 130 to the previous service provider 110. The decision may be a combination of a current user rating 132 and previous vehicle condition report 133. The report may be an automated report that is based on the sensor data identifying the information retrieved during the previous rental event. The condition of the vehicle may be a score based on various sensor data readings indicating an optimal use, a less than optimal use and/or a poor use performed by the user. The condition may be a score and the resulting rating of the user profile may be a score as well that is based on multiple history instances of ratings and reviews which are used to modify the current rating. For example, if the user has an overall rating of 82 out of 100 and the current vehicle condition of a most recent rental is less than optimal (e.g., vehicle condition score 65 out of 100), the decision score may be a function of both scores, such as an average of the two scores. The decision score may be based on a weighted percentage of both values prior to an average. For example, the decision score may be a function of: ((user rating*0.75+vehicle condition score*0.25)/2). This approach weights the overall user rating higher than just the previous vehicle condition score.

Figure 1D:
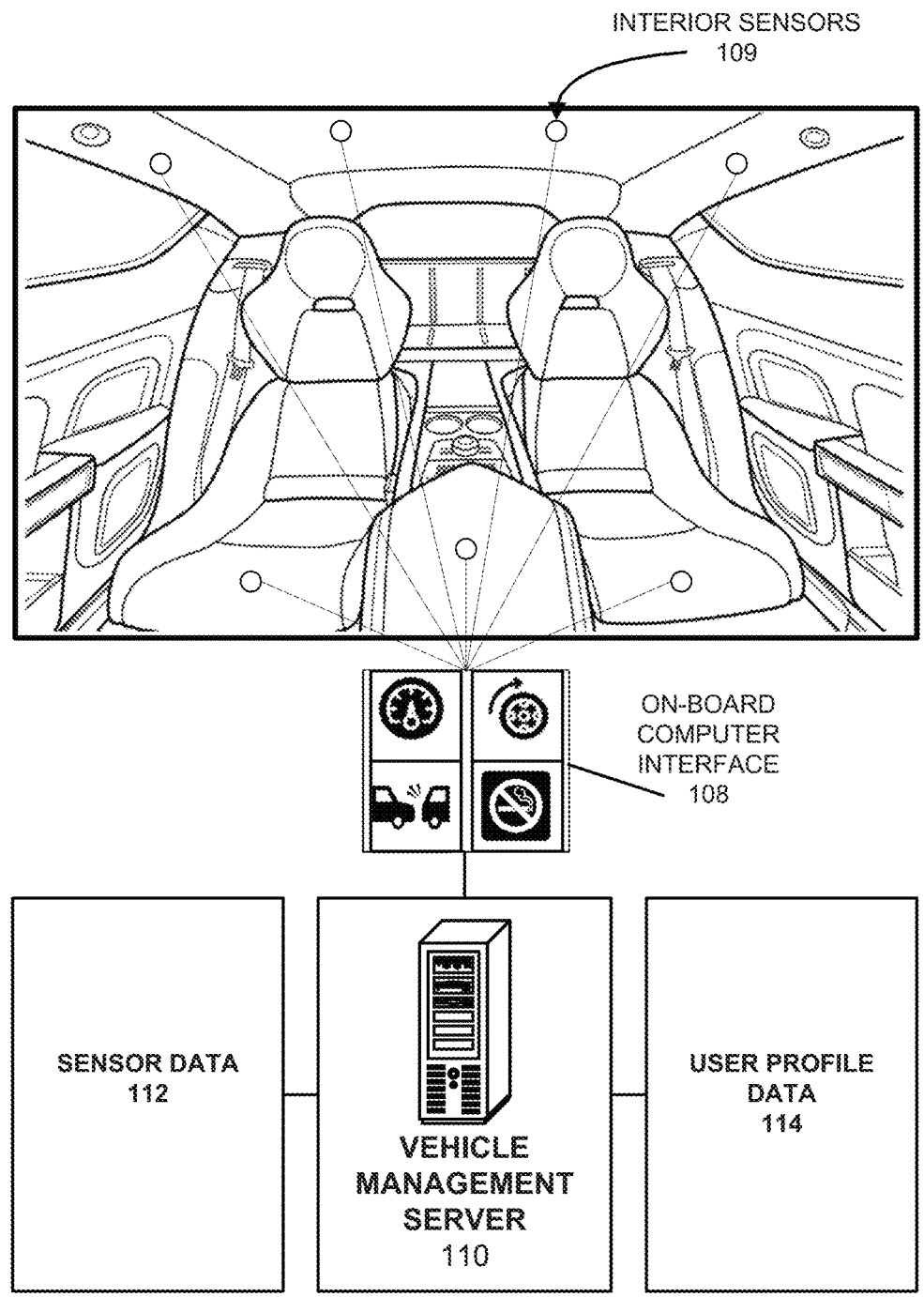
FIG. 1D illustrates a transport interior event monitoring configuration, according to example embodiments.

FIG. 1D illustrates a network diagram of a transport event modification configuration, according to example embodiments. Referring to FIG. 1D, the example 180 is for an interior vehicle condition process where interior sensors 109 are used to detect interior damages, such as chemical substances (e.g., smoking, vaping, noxious liquids) via chemical sensors, moisture sensors, etc. Also, other types of interior damage may be detected via weight sensors, flex sensors, etc. The interior sensors 109 may be hardwired to a central controller, or on-board computer 108, or other processor associated with the vehicle, or may instead be providing wireless communications with the central controller of the vehicle's computer 108 via various wireless communication protocols. Yet another example may be a scanning sensor that identifies cuts, holes and/or missing parts via laser scanners, infrared sensors, etc. A detected event inside the vehicle may be logged in a temporary vehicle profile until a final check can be performed to ascertain whether any damages may have occurred. The vehicle management server 110 may receive the sensor data 112 and/or the user profile data 114 to pair the detected conditions with the user profile for automated condition scores, user reviews, and modified user rating scores.

Figure 2A:
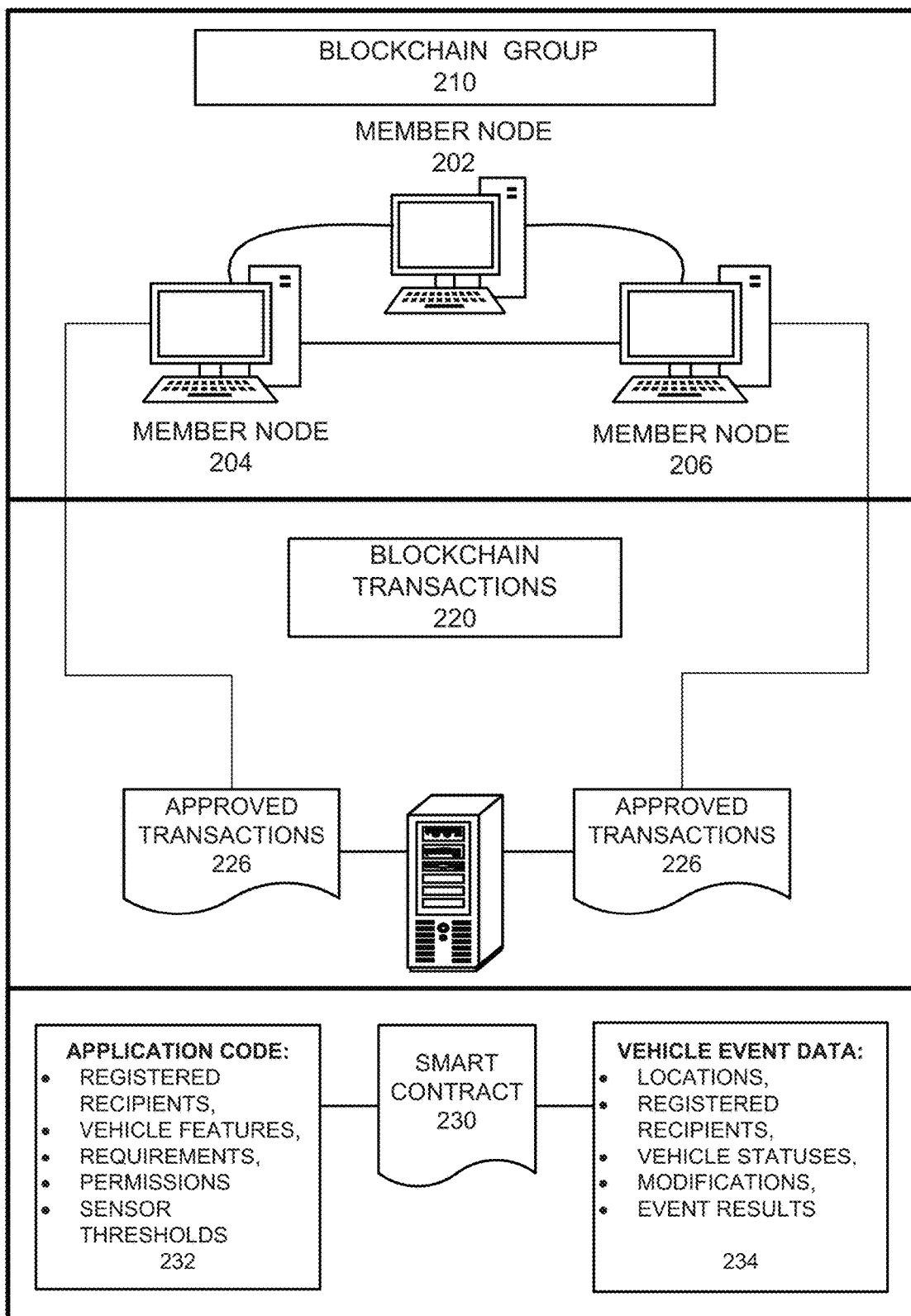
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain member nodes 202-206 as part of a blockchain group 210.

The permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 220 are stored in memory of computers as the transactions are received and approved by the consensus model dictated by the members' nodes. Approved transactions 226 are stored in current blocks of the blockchain and committed to the blockchain via a committal procedure which includes performing a hash of the data contents of the transactions in a current block and referencing a previous hash of a previous block. Within the blockchain, one or more smart contracts 230 may exist that define the terms of transaction agreements and actions included in smart contract executable application code 232. The code may be configured to identify whether requesting entities are registered to receive vehicle access, what features they are entitled/required to receive given their profile statuses and whether to monitor their actions in subsequent events. For example, when an event occurs and a user is riding in the vehicle, the sensor data monitoring may be triggered, and a certain parameter, such as a vehicle velocity, may be identified as being above/below a particular threshold for a particular period of time, then the result may be a change to a current status which requires an alert to be sent to the managing party (i.e., parent, server, etc.) so the deviation can be corrected and noted. The vehicle sensor data collected may be based on types of sensor data used to collect information about vehicle's driving. The sensor data may also be the basis for the vehicle event data 234, such as a location(s) to be traveled, an average speed, a top speed, acceleration rates, whether there were any collisions, was the expected route taken, whether safety measures in place, etc. All such information may be the basis of smart contract terms 230, which are then stored in a blockchain. For example, sensor thresholds stored in the smart contract can be used as the basis for whether a detected condition is permitted or indicates vehicle misuse.

Figure 2B:
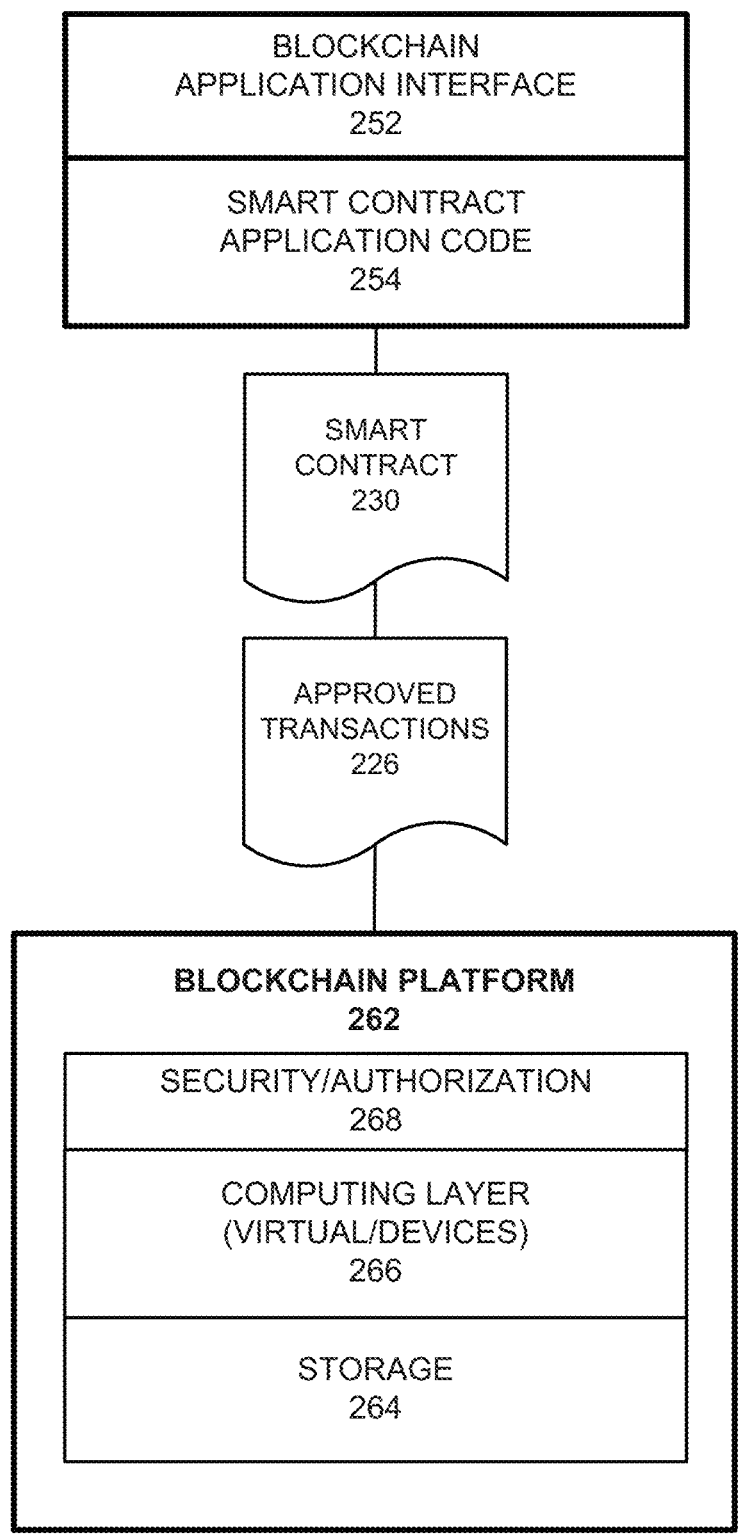
FIG. 2B illustrates a shared ledger configuration, according to example embodiments.

FIG. 2B illustrates a shared ledger configuration, according to example embodiments. Referring to FIG. 2B, the blockchain logic example 250 includes a blockchain application interface 252 as an API or plug-in application that links to the computing device and execution platform for a particular transaction. The blockchain configuration 250 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 254 provides a basis for the blockchain transactions by establishing application code which when executed causes the transaction terms and conditions to become active. The smart contract 230, when executed, causes certain approved transactions 226 to be generated, which are then forwarded to the blockchain platform 262. The platform includes a security/authorization 268, computing devices which execute the transaction management 266 and a storage portion 264 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 2A and 2B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 3A:
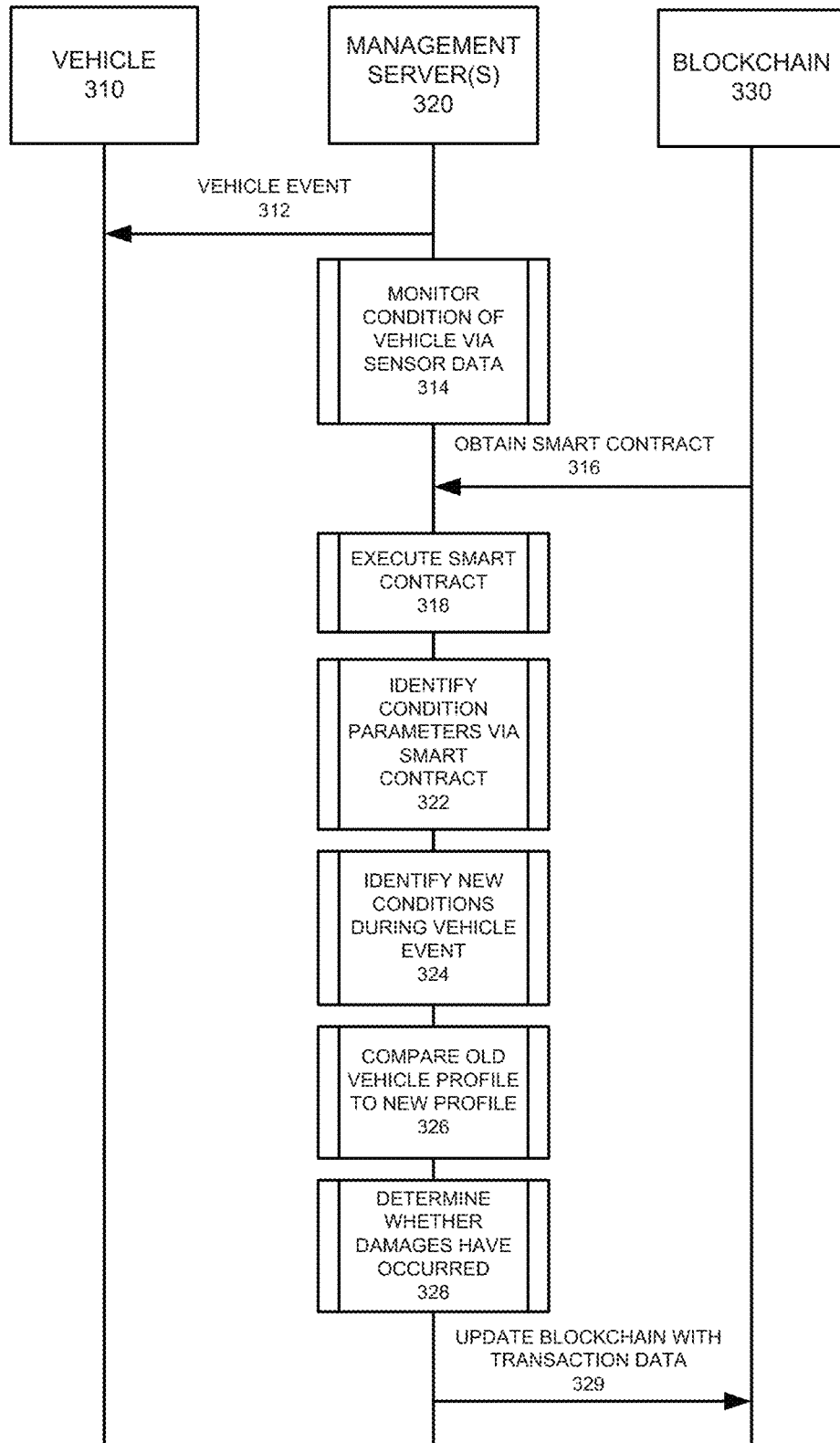
FIG. 3A illustrates a transport event monitoring configuration, according to example embodiments.

FIG. 3A illustrates a transport access system configuration, according to example embodiments. Referring to FIG. 3A, the system 300 provides a transport/vehicle 310, which may be requested via a user submitted request to initiate a vehicle event 312, which may be managed by a management server 320. The server 320 may identify a particular vehicle 310 being requested, such as one owned by a user, or one that is selected for purchase, rent, or is available for rental/taxi purposes. The user profile of the requesting entity may also be retrieved to apply to the vehicle 310 along with a set of defined vehicle features which are required/prohibited during operation. The procedure for accessing and receiving a vehicle may be managed by a smart contract 316 associated with a blockchain. The smart contract may be executed 318 to enable a new vehicle event. The vehicle that is ideal for such an event may be identified as available, and target device may be identified and monitored via sensor data for condition updates 314. This process may load the user's profile on the vehicle and/or a customized vehicle event file that includes requirements, conditions, etc., retrieved from the user's profile and which are applied to a vehicle computer, via the smart contract 322, so the correct conditions are monitored by the central vehicle controller. During operation, such as once the user has started moving with the vehicle, any newly detected conditions (e.g., velocity, acceleration, velocity, collision) 324 may be identified and stored in a temporary profile file for subsequent reporting of vehicle status. For example, when the vehicle experiences a sensor based detection of a potentially damaging condition (sensor data exceeds known threshold(s)), the data is collected and used to populate a temporary profile. When a final analysis is performed to identify potential damages, an older and previously existing vehicle profile indicating any conditions prior to the current vehicle event may be compared to the new profile 326 created with the vehicle conditions detected in the current vehicle event. The result of the comparison may be a determination as to whether damages have occurred 328. All updates are stored in the blockchain 330 via new data transactions 329. In another embodiment, the payment for the renting of the object, such as a transport, is governed and/or occurs in the smart contract.

Figure 3B:
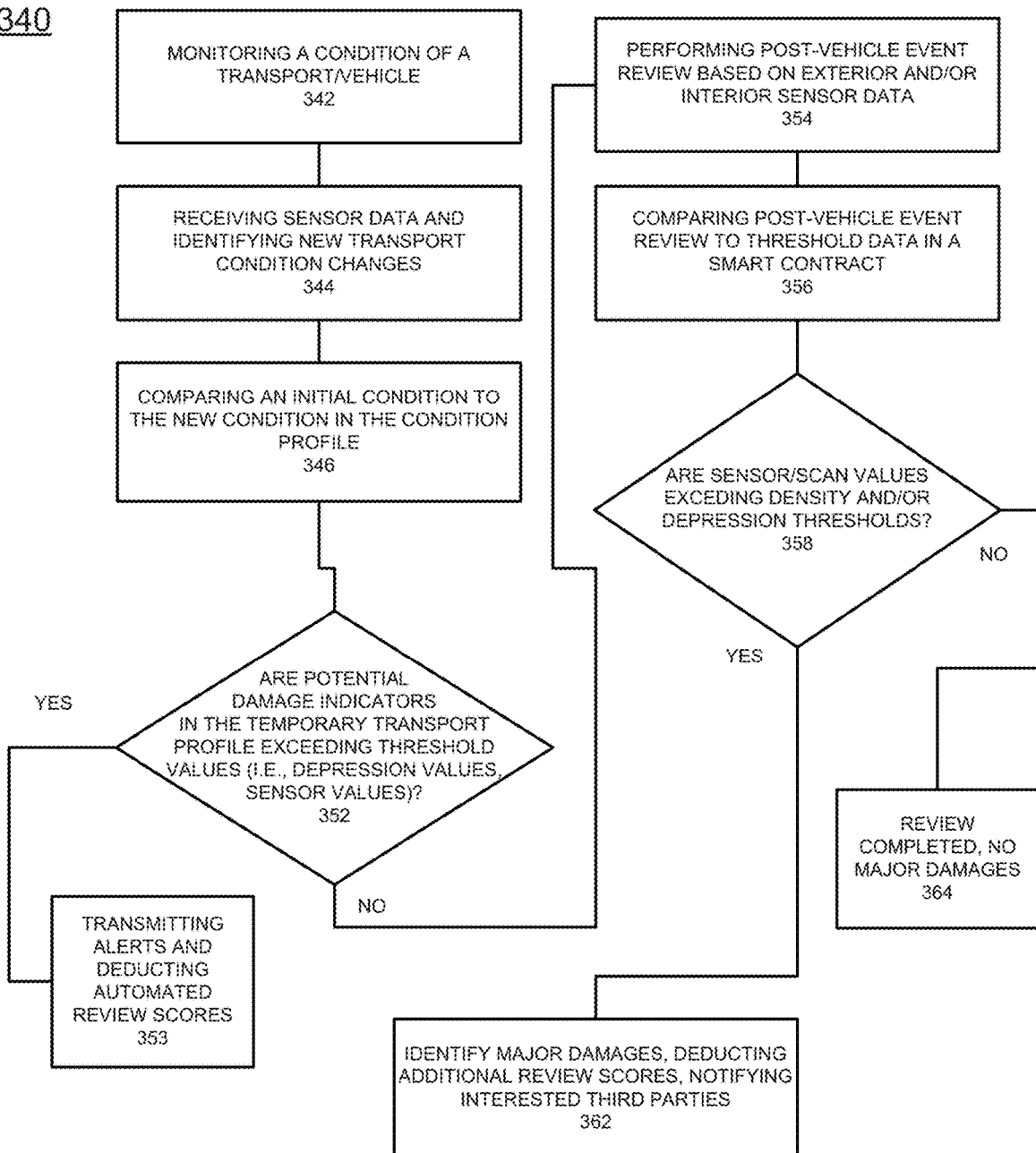
FIG. 3B illustrates a flow diagram of transport event monitoring, according to example embodiments.

FIG. 3B illustrates a flow diagram of transport event monitoring, according to example embodiments. Referring to FIG. 3B, the flow diagram 340 includes a process to track a vehicle event for condition updates and other vehicle data to prepare a user review and determine vehicle damages. The process may include monitoring a condition of a transport/vehicle 342. Throughout the disclosure, the terms vehicle and transport are used interchangeably. The sensor data associated with the sensors on the transport are used to retrieve sensor data to identify changes. A change may occur when a threshold event is detected. For example, a velocity sensor may not collect velocity data when the vehicle is only exceeding a speed limit by 5 MPH or less. Also, a collision sensor may only collect sensor data when the vehicle is being touched or moved past a certain movement sensor threshold. The sensor data retrieved and stored may be referred to as relevant data, indicating such data may be excessive enough to have caused a detectable damage to the vehicle. As the relevant data is retrieved and stored, the data may be the basis of new transport condition changes 344. In order to ascertain whether the current vehicle operator is responsible for damages, the initial condition of the vehicle must be compared 346 to the new conditions sensed via the sensor data. The deviations between the new data and the old data may dictate whether the new changes are caused by the new event and are thus the responsibility of the current user.

Continuing with the same example, the potential damages are identified by retrieving the sensor data/damage indicators in the temporary transport profile file and comparing them to threshold values, such as depression (i.e., distance values) used to identify excessive tire wear, dents in the body of the vehicle, etc., and other sensor values (e.g., acceleration, velocity, chemical sensors, moisture sensors), to determine whether the damage thresholds have been exceeded 352. The thresholds may be two-fold, for example, a first threshold is used to identify a potential damage, such as a collision detection threshold indicating an actual movement event which could be an accident. However, the second threshold, such as the depression threshold may be identified by an automated scanner that beams lasers and/or infrared signals against the vehicle body to determine whether the damage actually occurred. For example, the first threshold may have been exceeded (i.e., movement from a collision) and such an event may invoke the second test to be performed (i.e., the scan). A vehicle which may have been involved in a collision detection event may not actually be damaged based on the scan procedure, and thus the user may not be liable for damages, however, the user's review may be affected, and their review score may be actually lowered even though they did not have to be fined for damages. The second threshold may not be exceeded in this example and thus the user is not liable for damages.

Alerts may be sent 353 to the interested parties if the damages are present. If the damages are not readily apparent based on the first threshold test, the post-vehicle event review may be performed 354 based on exterior and/or interior sensor data and/or scan procedures. The post-event review can be compared to known thresholds in the smart contract 356 for a decision regarding the vehicle status and damages. The secondary thresholds, such as depression values and/or chemical/moisture densities can be used to make a secondary decision on damages 358. The result may be no damages 364 or identifying the damages and determining a responsibility value to the user 362. A review score for this event may be identified and created automatically based on the results.

Figure 3C:
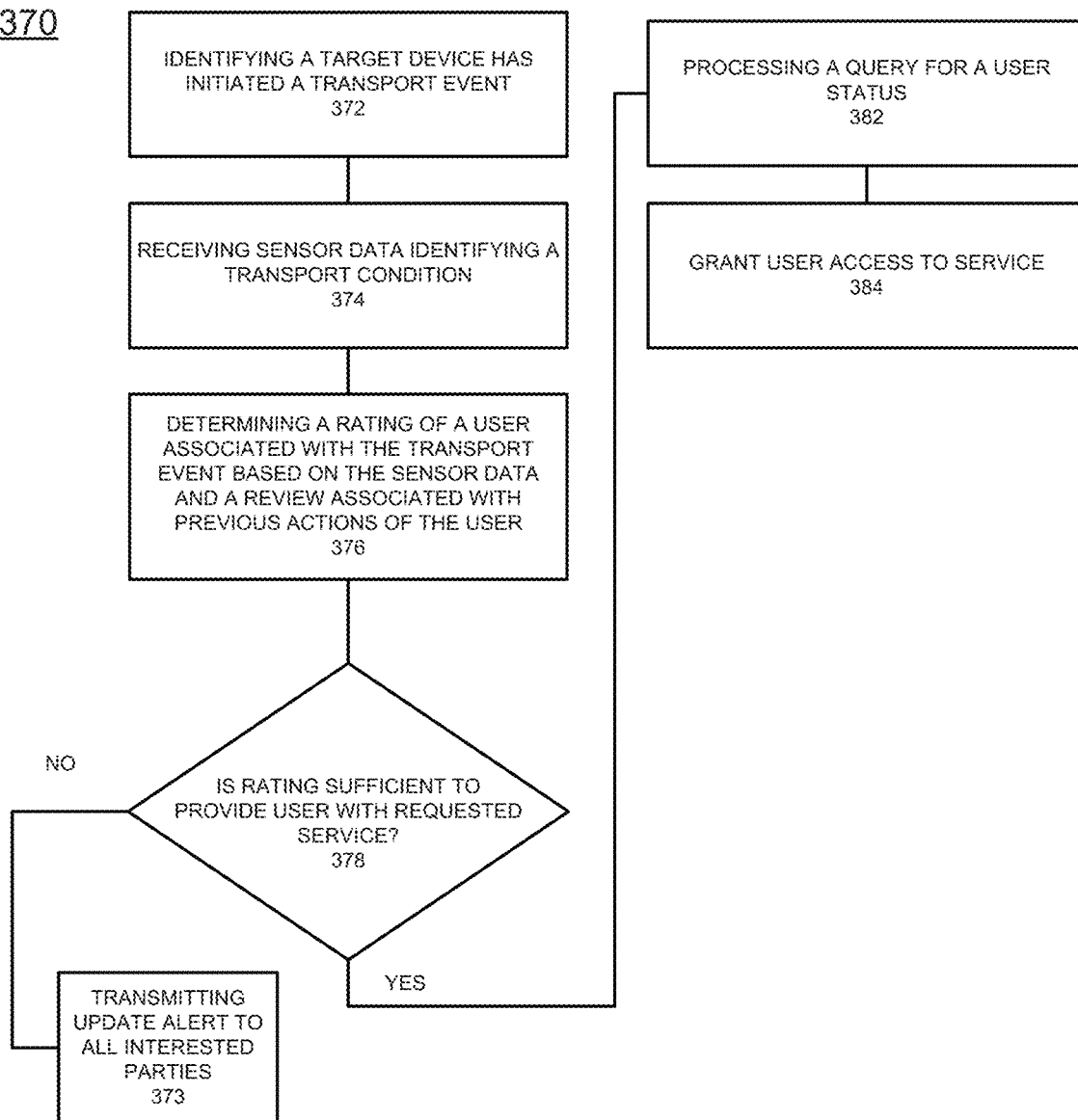
FIG. 3C illustrates another flow diagram of transport event monitoring, according to example embodiments.

FIG. 3C illustrates another flow diagram of transport event monitoring, according to example embodiments. Referring to FIG. 3C, the example method 370 provides an example of an identifying previous event data, such as a user rating and/or score to determine whether to grant a user access to a vehicle event. In operation, the method may include identifying a target device, such as a user device has initiated a new transport event request 372, receiving sensor data identifying a transport condition 374, which may be a previously logged transport event used as the basis for a record check or user profile analysis prior to granting a new access right. The process may also include determining a rating of a user associated with the transport event based on the sensor data and/or a review of that event that indicates the user profile of the user and the status of the event 376. Once the user profile data is identified, a decision is made regarding whether the review, current rating value (i.e., overall rating) or the condition of the last transport rented is sufficient to grant the user a right for a next rental event 378. The decision not to permit the request 373 may be sent to the interested parties, such as a second server inquiring to a first server about the previous event. If the rating is deemed sufficient (i.e., above a threshold score), then the query received from the first server and/or the second server may be processed to provide a decision 382 as to whether the user is accepted for a next event. If so, the user is granted access 384.

Figure 4A:
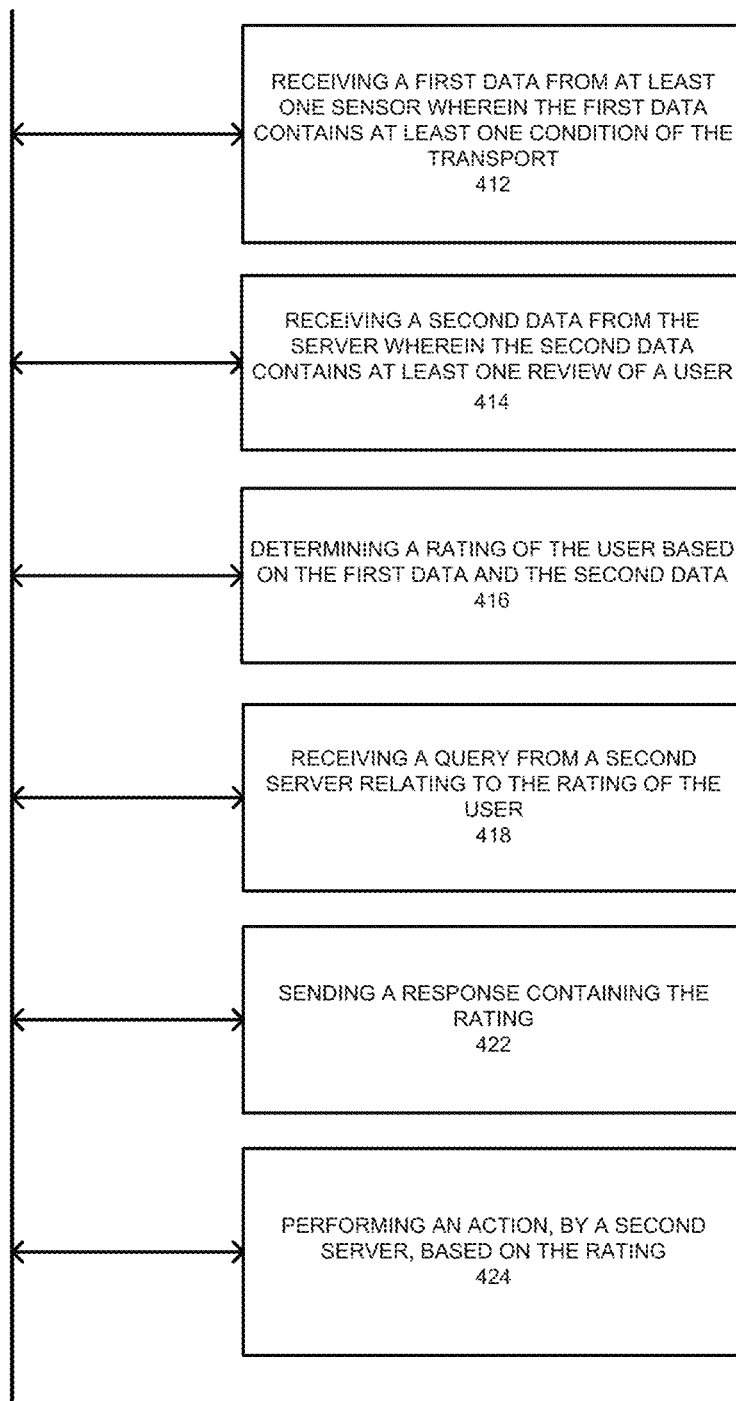
FIG. 4A illustrates a transport event monitoring and service decision configuration flow diagram, according to example embodiments.

FIG. 4A illustrates a transport event monitoring and service decision configuration flow diagram, according to example embodiments. Referring to FIG. 4A, the method 400 may include receiving a first data from at least one sensor where the first data contains at least one condition of the transport, such as a previously logged condition (e.g., excellent, fair, poor, etc.) 412, receiving a second data from the server where the second data contains at least one review of a user 414. The at least one review of the user may be related to a previous rental related to a transport or pertaining to another type of rental, such as renting a house, or a hotel room or the like. In another embodiment, the review may be related to a social-score, such as a score related to the social networking behavior of a user. In yet another embodiment, the review may be a review related to a user's behavior in a business and/or education environment. In a further embodiment, the review may be associated with the user's tipping habits, where the percentage of tips received by the user is retained and averaged over a period of time, for example. A rating of the user is determined based on the first data and the second data 416, which may be performed independently of an existing review/rating based on a weighted combination of the review and the previous vehicle condition status. The method may also include receiving a query from a second server relating to the rating of the user 418, such as the service provider of the currently requested vehicle, sending a response containing the rating 422 and performing an action, by a second server, based on the rating 424. The action may be to allow or not allow the current request.

In another embodiment, the action may be associated with the availability of the requested item, such as a transport. For example, there may be a high demand for a transport, and the returned rating of each user is used to determine where in a queue the respective user is placed, such as those users with a higher rating are higher in the queue.

In yet another embodiment, a percentage (positive or negative) may be associated with a returned rating such that the cost of renting the object, such as a transport, is multiplied by the percentage. For example, a calculation is used to determine the delta between the normal price of a rented transport, and the difference associated with the returned rating. A rating of 5/10, which is the middle rating relates to the user paying the normal price. Each rating number higher than the middle rating reflects a discount by a percentage (e.g. 2%), and each rating number lower than the middle reflects an increase by a percentage (e.g. 2%). Thus, if a user has a rating of 8/10, then they pay the normal rate, minus 6% (2%/number greater than 5). If a user has a rating of 3/10, then they pay the normal rate, plus 4% (2%/number less than 5).

The transport may be a transport which may be rented, such as car, van, truck, motorcycle, RV, water vehicle, scooter, bicycle, and any object that may be used to transport people and or goods from one location to another. The rented object may be one or more of a scooter and a vehicle, the at least one review includes a critique of the user where the user rented a residence. The at least one condition is one or more of a scratch, a dent, a decrease in value and a failure in the functionality of the transport. The one or more of the first data and the second data may be one or more of a time stamp, a location, a video file, an image file and an audio file. A smart contract may be referenced for decision information pertaining to the decision to allow or not allow the event.

In another embodiment, the condition of the transport is compared against a threshold. The threshold may be any normal condition of a rented object, such as a transport or hotel room. The threshold is determined and stored in the system. For example, the threshold may be one or more of: the length of a scratch on a transport, the delta of the tread of the tires, the condition of the seats in the interior of a transport, the number of stains/burns in the carpet, the number of miles normally driven in the rented period of a transport, and the like.

Figure 4B:
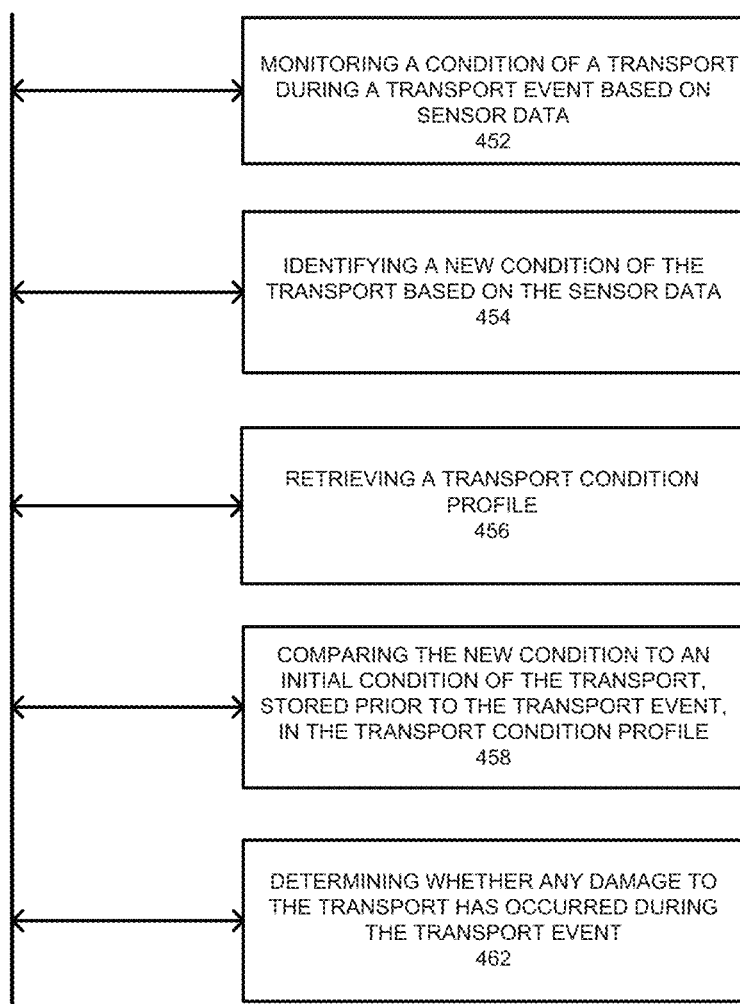
FIG. 4B illustrates a transport event condition monitoring configuration, according to example embodiments.

FIG. 4B illustrates a transport event condition monitoring configuration, according to example embodiments. Referring to FIG. 4B, the method 450 may include monitoring a condition of a transport during a transport event based on sensor data 452, identifying a new condition of the transport based on the sensor data 454, retrieving a transport condition profile 456 comparing the new condition to an initial condition of the transport 458, stored prior to the transport event, in the transport condition profile, and determining whether any damage to the transport has occurred during the transport event 462. The user may then be rated and given an automated rating with a score, words describing the condition and a separate claim may be created to hold the user responsible fir any damages based on the detected damages.

The method may also include identifying an exterior body sensor has indicated a potential damage to an exterior transport body of the transport, storing a potential damage indicator in a temporary transport profile, comparing the temporary transport profile to the transport condition profile, and determining whether any damage to the exterior transport body has occurred based on the comparison. In this example, the vehicle sensor may indicate a collision and store that collision information in the temporary profile. The transport condition profile may be used to compare the temporary information to the existing information to determine any deviations from a previous usage event and thus hold the current user responsible for the new damages. The sensor on the vehicle exterior may determine whether the exterior transport body has exceeded a threshold depression value, or, a separate scan operation via a. scan device can detect a vehicle body status profile and compare it to the last known vehicle body status profile to identify deviations. The method may also include determining whether any damage to the exterior transport body has occurred when the threshold depression value is exceeded. A threshold depression value may define an amount of distance or discoloration which must occur prior to designating the amount of damages. A small scratch or tiny paint deviation may not be detected during this process based on the threshold value of distance/discoloration area required prior to designating the transport damaged.

The method may also include updating the transportation condition profile with the new condition, determining whether to deduct a rating score of a user profile associated with the transport event based on the new condition, and automatically creating a user review comprising the deducted rating score based on the new condition. The review may include comments automatically generated to identify the type of damage detected, which can be paired with a score deduction to indicate a magnitude of damages to the vehicle. A user's review score should be inversely proportional to the amount of damage caused. The method may also include identifying an interior body sensor has indicated a potential damage to an interior transport body of the transport, storing a potential damage indicator in the temporary transport profile, performing an interior transport body sensor detection scan to collect interior scan data, comparing the interior transport body sensor detection scan data to the potential damage indicator, determining whether the vehicle has been damaged based on a comparison of the interior transport body sensor detection scan data to the potential damage indicator, and determining whether the interior vehicle body sensor detection scan data identifies an exceeded threshold sensor density value based on the interior vehicle body of the vehicle, and determining the transport is damaged when the threshold density value is exceeded. The method may also include responsive to identifying the transport event, retrieving a smart contract from a distributed ledger, and identifying, from the smart contract, one or more sensors required to collect sensor data during the transport event, and one or more thresholds used to identify whether the transport is damaged, and creating a blockchain transaction identifying whether the transport has been damaged during the transport event based on a comparison of detected transport conditions to the one or more thresholds.

Figure 4C:
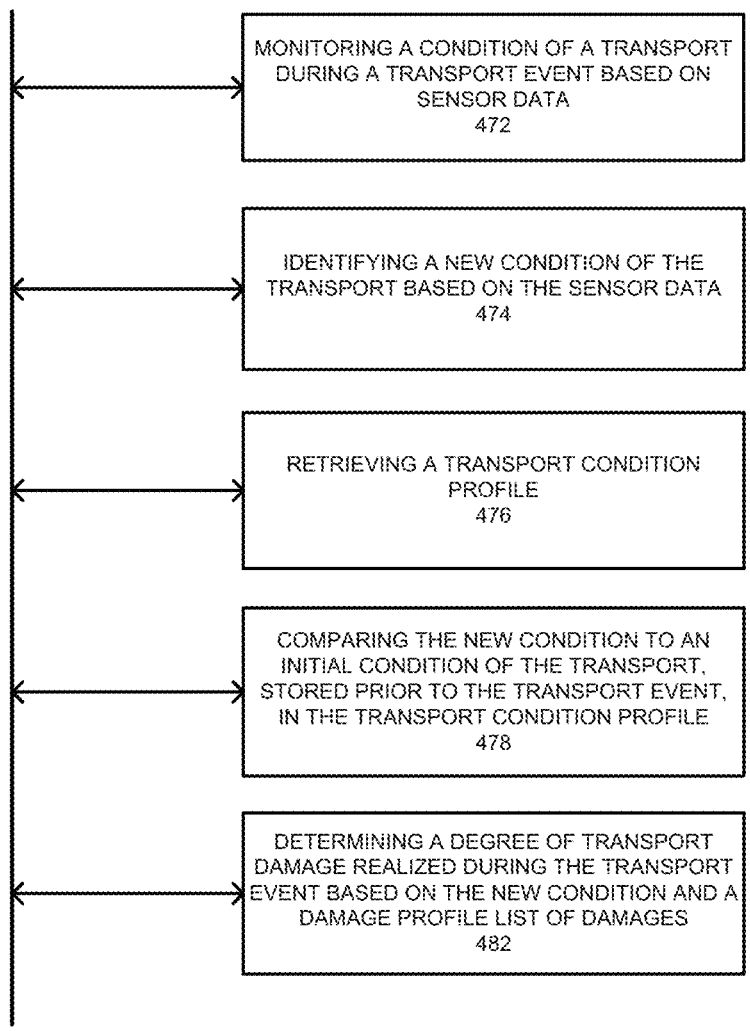
FIG. 4C illustrates yet another transport event condition monitoring configuration, according to example embodiments.

FIG. 4C illustrates a transport event condition monitoring configuration, according to example embodiments. Referring to FIG. 4C, the method 470 may include monitoring a condition of a transport during a transport event based on sensor data 472, identifying a new condition of the transport based on the sensor data 474, retrieving a transport condition profile 476, comparing the new condition to an initial condition of the transport, stored prior to the transport event, in the transport, condition profile 478, and determining a degree of transport damage realized during the transport event based on the new condition and a damage profile list of damages 482. In this example, the list of damages may be used to ascertain a degree of damage to a vehicle. A sensed condition may be identified by a body portion of the vehicle, a degree of the impact data, and that data may be compared to a list of sensor data, such as which sensors on which portions of the vehicle detected damages, a degree of the damage based on a magnitude of sensed impact in the case of a set of sensors using a combing analysis to identify damages. For example, a bumper sensor may identify the collision in the center of the bumper, two other bumper sensors may identify the damage as well, this indicates a new bumper, however, the accelerometer and velocity sensors may be cross-referenced to identify a movement magnitude of the event in addition to the knowledge of the bumper being impacted, if the movement magnitude is small, the bumper may not need to be replaced and only painted, if the movement magnitude is large, the entire bumper would need to be replaced along with sensors in the bumper, infrared backup sensors in the bumper, etc.

Figure 5A:
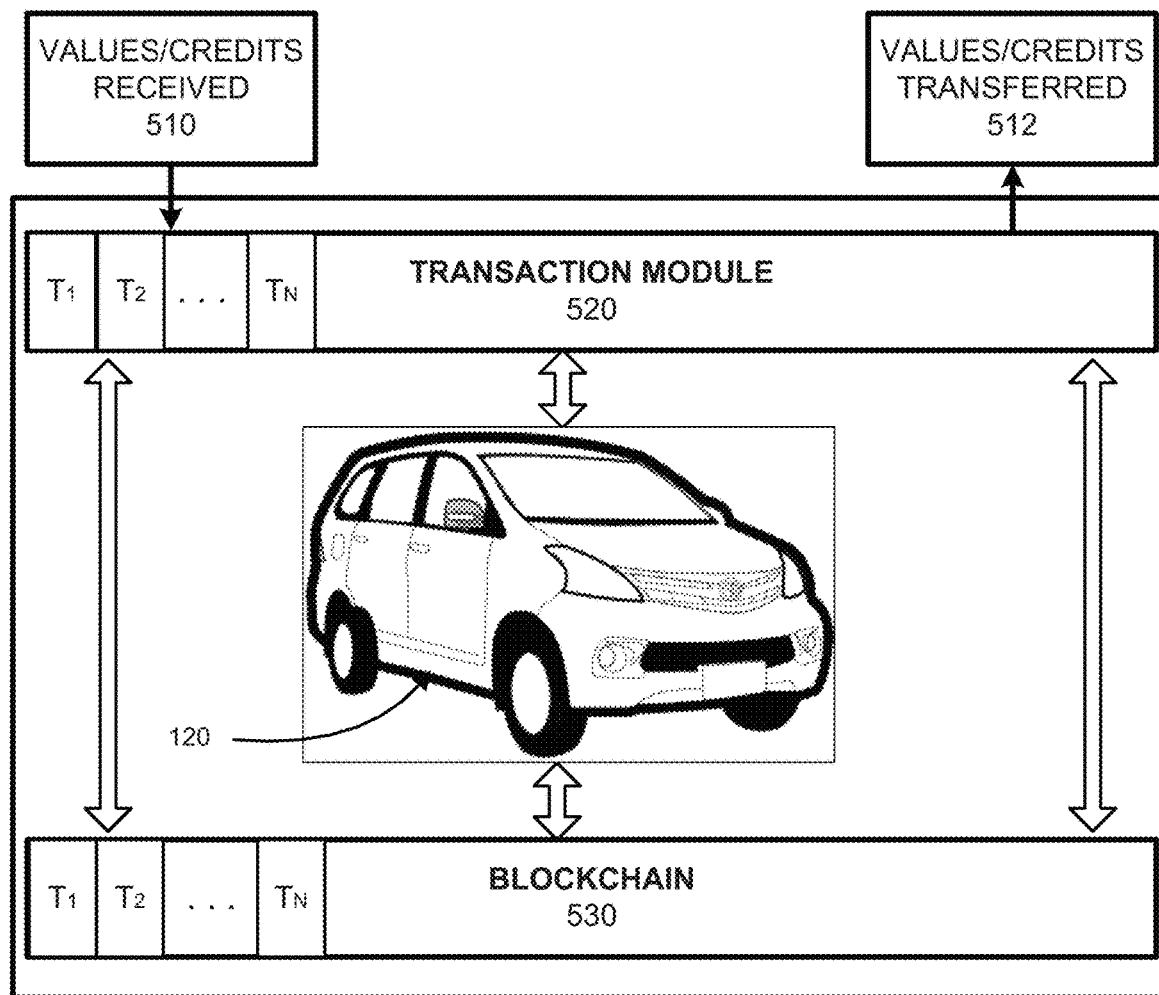
FIG. 5A illustrates an example blockchain transport configuration, according to example embodiments.

FIG. 5A illustrates an example blockchain vehicle configuration 500 for managing blockchain transactions associated with a vehicle, according to example embodiments. Referring to FIG. 5A, as a particular transport/vehicle 120 is engaged in transactions, such as service transactions (e.g., vehicle service, dealer transactions, delivery/pickup, transportation services, etc.), the vehicle may receive values 510 and/or expel/transfer values 512 according to a service transaction(s). The transaction module 520 may record information, such as parties, credits, service descriptions, date, time, location, results, notifications, unexpected events, etc. Those transactions in the transaction module 520 may be replicated into a blockchain 530 which is managed by a remote server and/or remote blockchain peers, among which the vehicle itself may represent a blockchain member and/or blockchain peer. In other embodiments, the blockchain 530 resides on the vehicle 120. The values/credits received and/or transferred can be based on at least one condition of the transport, as described herein.

Figure 5B:
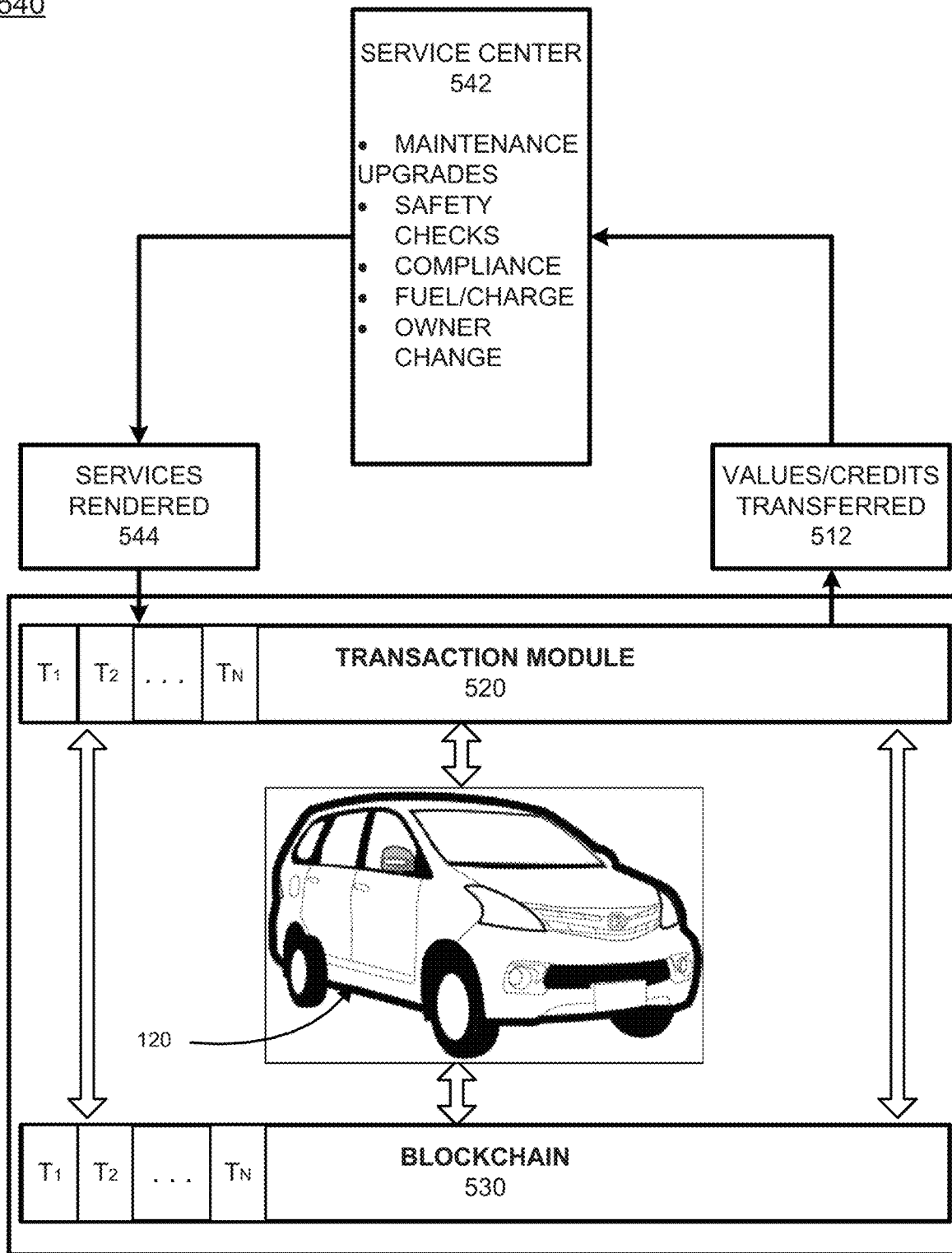
FIG. 5B illustrates another example blockchain transport configuration, according to example embodiments.

FIG. 5B illustrates an example blockchain vehicle configuration 540 for managing blockchain transactions between a service center and a vehicle, according to example embodiments. In this example, the vehicle 120 may have driven itself to a service center 542 (e.g., automotive dealer, local service stop, delivery pickup center, etc.) because the vehicle needs service and/or needs to stop at a particular location. The service center 542 may register the vehicle for a service call at a particular time, with a particular strategy, such as oil change, battery charge or replacement, tire change or replacement, and any other transport related service. The services rendered 544 may be performed based on a smart contract which is downloaded from or accessed via the blockchain 530 and identified for permission to perform such services for a particular rate of exchange. The services are logged in the transaction log of the transaction module 520, the credits 512 are transferred to the service center 542 and the blockchain may log transactions to represent all the information regarding the recent service. In other embodiments, the blockchain 530 resides on the vehicle 120 and/or the service center 542. In one example, a transport event may require a refuel or other vehicle service and the user may then be responsible for the responsibility value increase for such a service. The service may be rendered via a blockchain notification which is then used to redistribute the responsibility value to the user via their respective fractional responsibility values. Adherence to a regular service schedule may be part of the adherence rate or compliance necessary to achieve an optimal user vehicle status. A service stop may/may not be a permissible action permitted by a vehicle event associated with a particular occupant/target user, depending on their status. Additionally, if the vehicle prompted a user to make a service stop and the user refused, this inaction could cause a user review deduction and/or a vehicle condition deduction which is added to the overall user rating and/or damages list, which the user could be responsible for at the end of the event. Responsibility for the service center activities can be based on a determined condition of the transport, as described herein.

Figure 5C:
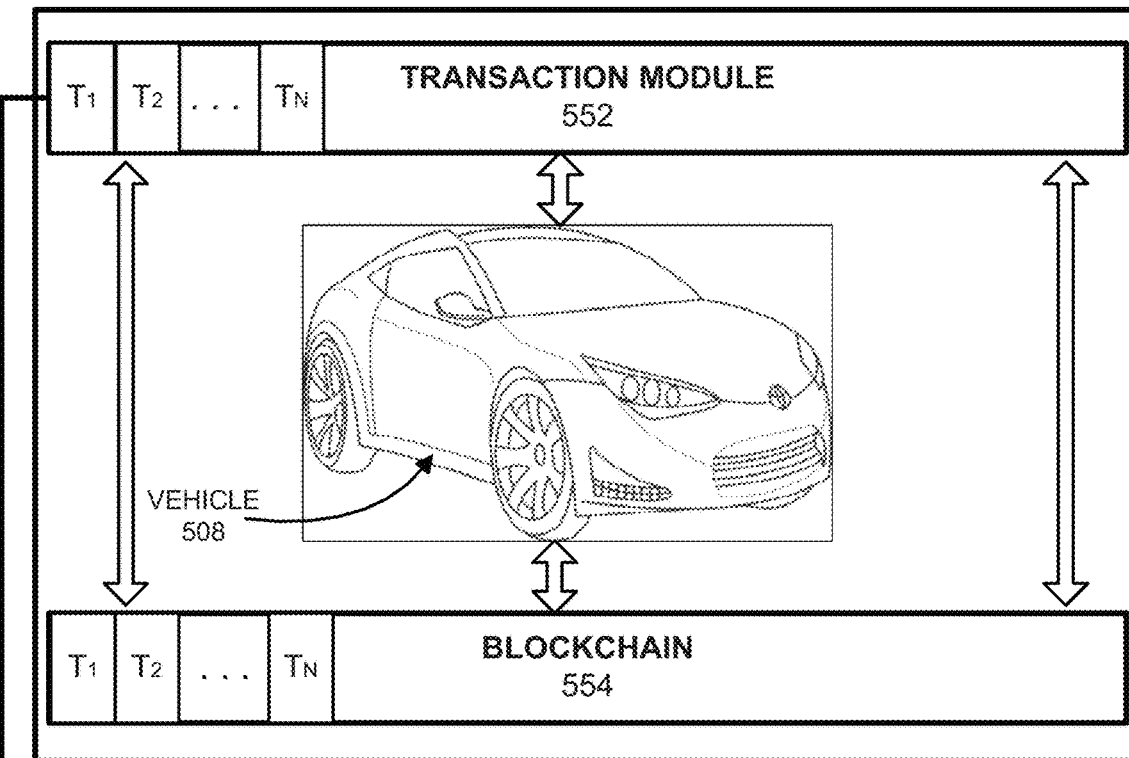
FIG. 5C illustrates a further example blockchain transport configuration, according to example embodiments.
Figure 5C:
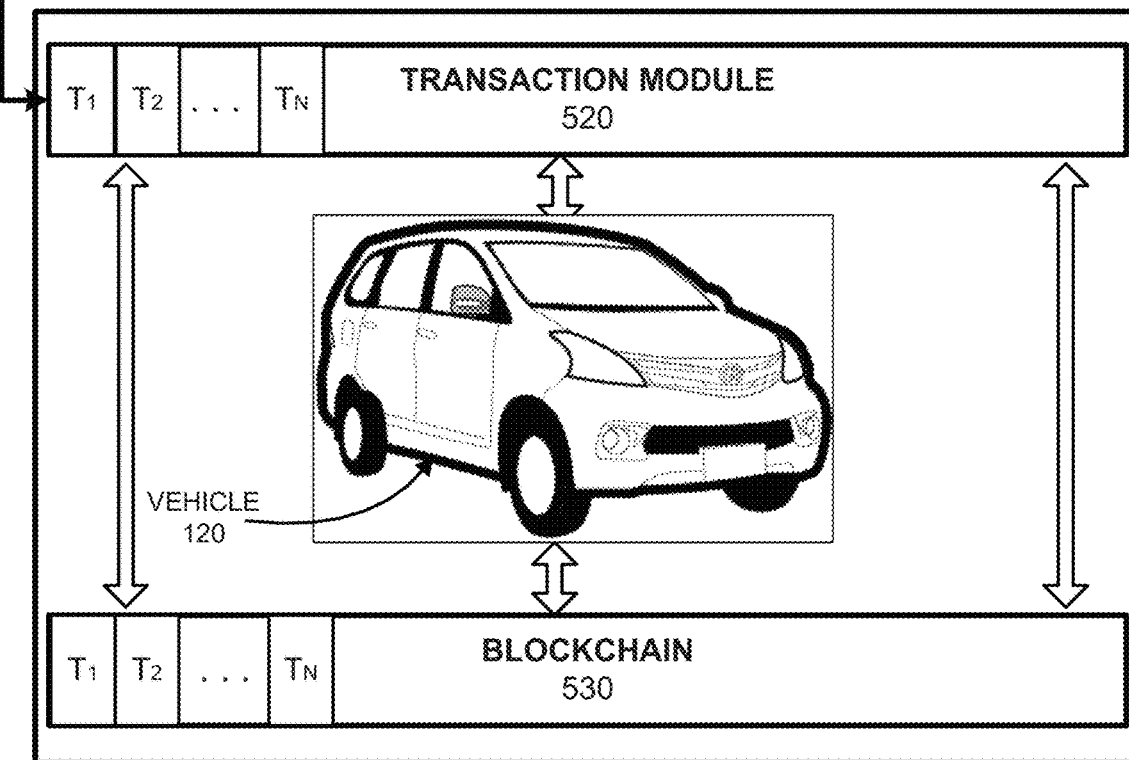

FIG. 5C illustrates an example blockchain vehicle configuration 550 for managing blockchain transactions conducted among various vehicles, according to example embodiments. The vehicle 120 may engage with another vehicle 508 to perform various actions, such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. The vehicle 508 may notify another vehicle 120 which is in its network and which operates on its blockchain member service. The vehicle 120 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 120 and the record of the transferred service is logged in the blockchain 530/ 554 assuming that the blockchains are different from one another, or, are logged in the same blockchain used by all members. In this example, if the user was not permitted to use the vehicle to make deliveries or perform similar actions, then the user review may reflect the decision to ignore the rules of the event, which could ultimately impact the user's score. Responsibility for the transferred credits can be based on at least one condition of the transport, as described herein.

Figure 6:
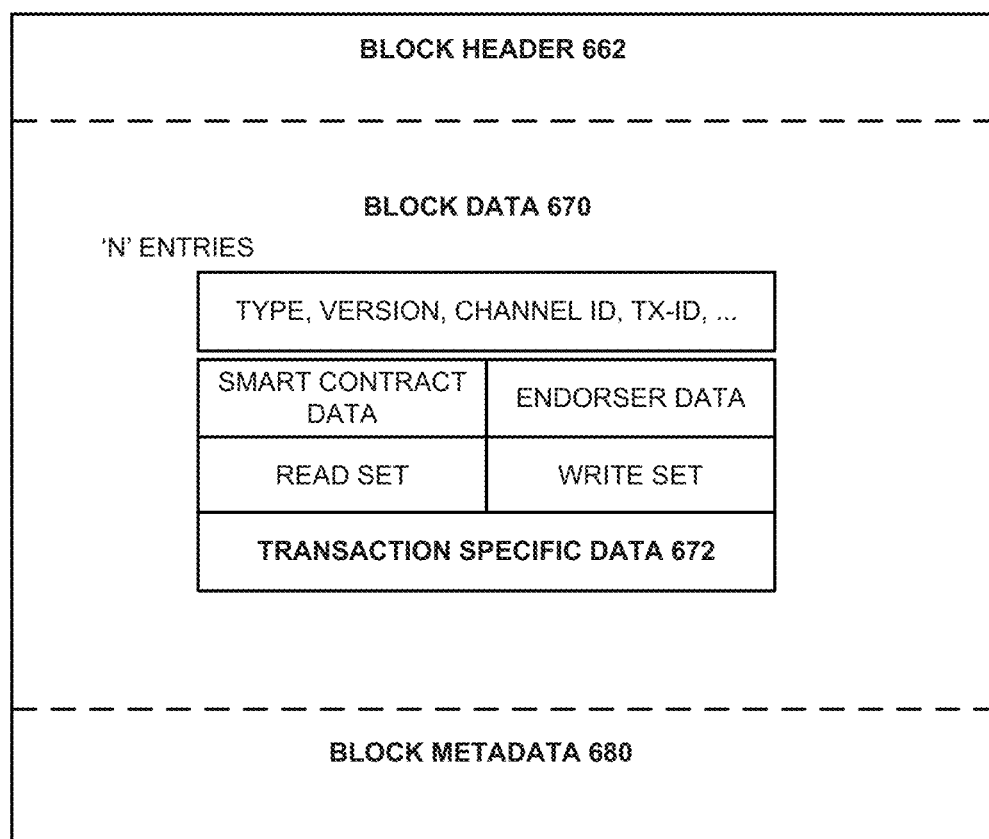
FIG. 6 illustrates an example data block, according to example embodiments.

FIG. 6 illustrates a blockchain block 600 that can be added to a distributed ledger, according to example embodiments, and contents of a block structure 660. Referring to FIG. 6, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a new data block 660 for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6, a block 660 (also referred to as a data block) that is stored on the blockchain and/or the distributed ledger may include multiple data segments such as a block header 662, transaction specific data 672, and block metadata 680. It should be appreciated that the various depicted blocks and their contents, such as block 660 and its contents are merely for purposes of an example and are not meant to limit the scope of the example embodiments. In some cases, both the block header 662 and the block metadata 680 may be smaller than the transaction specific data 672 which stores entry data, however this is not a requirement. The block 660 may store transactional information of N entries (e.g., 100, 500, 1000, 2000, 3000, etc.) within the block data 670. The block 660 may also include a link to a previous block (e.g., on the blockchain) within the block header 662. In particular, the block header 662 may include a hash of a previous block's header. The block header 662 may also include a unique block number, a hash of the block data 670 of the current block 660, and the like. The block number of the block 660 may be unique and assigned in an incremental/sequential order starting from zero. The first block in the blockchain may be referred to as a genesis block which includes information about the blockchain, its members, the data stored therein, etc.

The block data 670 may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 670 may also store transaction specific data 672 which adds additional information to the hash-linked chain of blocks in the blockchain. Accordingly, the data 672 can be stored in an immutable log of blocks on the distributed ledger. Some of the benefits of storing such data 672 are reflected in the various embodiments disclosed and depicted herein. The block metadata 680 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 670 and a validation code identifying whether an entry was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
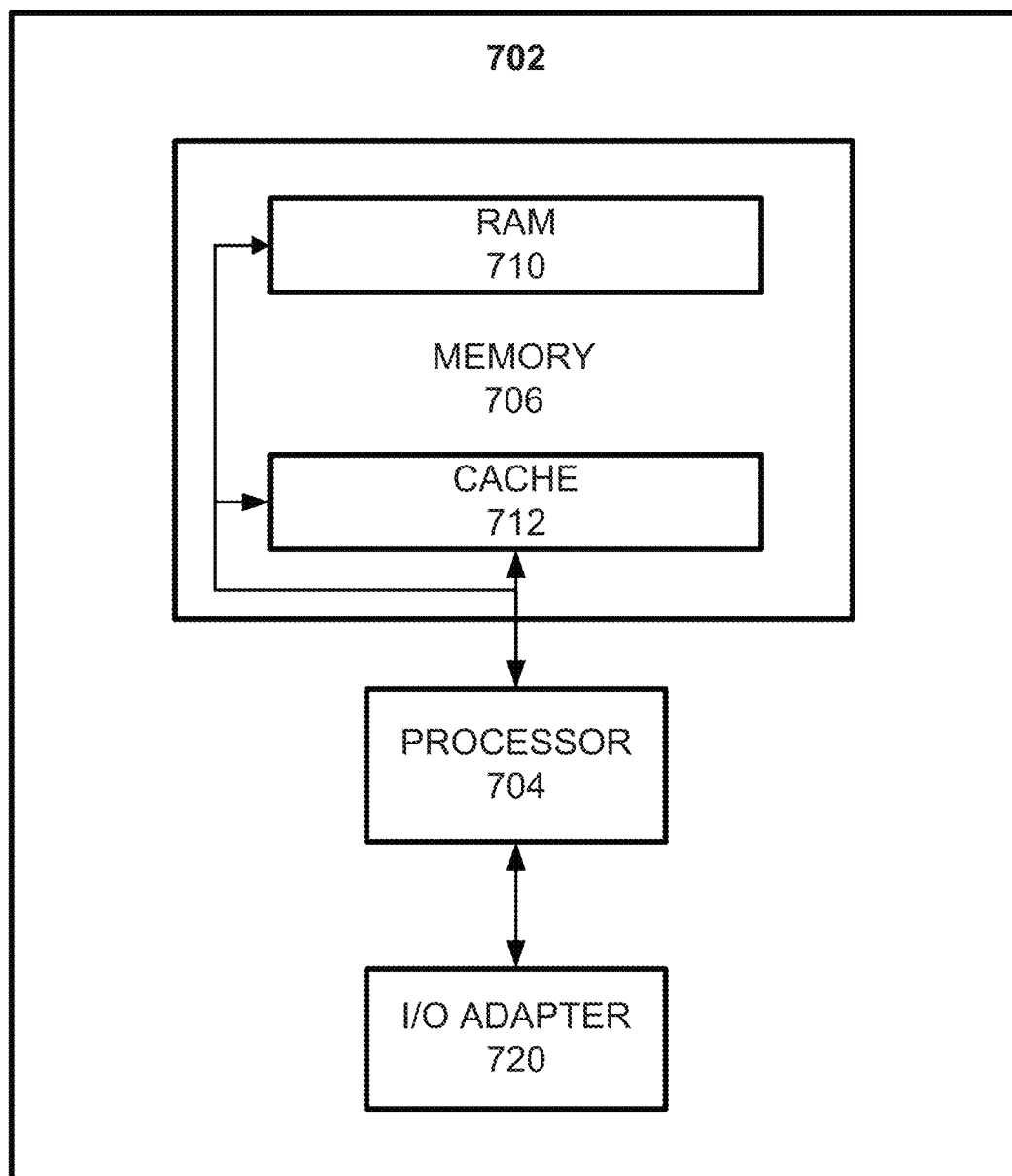
FIG. 7 illustrates an example system that can be used with one or more of the example embodiments.

FIG. 7 is not intended to suggest any limitation as to the scope of use or functionality of embodiments of the application described herein. Regardless, the computing node 800 is capable of being implemented and/or performing any of the functionality set forth herein.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via the I/O Adapter 720 such as a keyboard, a pointing device, a display, etc.; one or more devices that enable a user to interact with computer system/server 702; and/or any devices (e.g., network card, modem, etc.) that enable computer system/server 702 to communicate with one or more other computing devices. Such communication can occur via I/O interfaces. Still yet, computer system/server 702 can communicate with one or more networks such as a local area network (LAN), a general wide area network (WAN), and/or a public network (e.g., the Internet) via a network adapter. The network adapter communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   indicating potential damage to an interior of a transport, wherein the potential damage is stored in a temporary transport profile;
   comparing the temporary transport profile to a transport condition profile that includes an initial condition of the transport to determine an actual damage to the interior of the transport; and
   deducting a rating of a user profile associated with the transport based on the actual damage.

2. The method of claim 1, comprising:
   indicating potential damage to an exterior body of the transport;
   identifying an exterior transport body sensor that indicates a potential damage to an exterior body of the transport;

storing the potential damage indicator to the exterior body in the temporary transport profile;
comparing the temporary transport profile to the transport condition profile; and
determining whether any damage to the exterior body has been damaged based on the comparison.

3. The method of claim 2, comprising:
determining whether the potential damage has exceeded a threshold depression value; and
indicating the transport is damaged when the threshold depression value is exceeded.

4. The method of claim 1, comprising:
updating the transport condition profile with the actual damage; and
updating the rating of the user profile.

5. The method of claim 4, comprising:
creating a user review comprising the deducted rating of a user profile associated with the updated transport condition profile.

6. The system of claim 1, comprising:
responsive to the indication of the potential damage, retrieving a smart contract from a distributed ledger; and
identifying, from the smart contract, one or more sensors required to collect sensor data at the time of the potential damage.

7. The system of claim 6 comprising:
creating a blockchain transaction identify whether the transport is damaged at the time of the potential damage, based on a comparison of indicated potential damage to one or more thresholds.

8. A non-transitory computer-readable storage medium comprising instructions, that when read by a processor, cause the processor to perform: indicating potential damage to an interior of a transport, wherein the potential damage is stored in a temporary transport profile; comparing the temporary transport profile to a transport condition profile that includes an initial condition of the transport to determine an actual damage to the interior of the transport; and deducting a rating of a user profile associated with the transport based on the actual damage.

9. The computer-readable storage medium of claim 8, comprising:
indicating potential damage to an exterior body of the transport;
identifying an exterior transport body sensor that indicates a potential damage to an exterior body of the transport;
storing the potential damage indicator to the exterior body in the temporary transport profile;
comparing the temporary transport profile to the transport condition profile; and
determining whether any damage to the exterior body has been damaged based on the comparison.

10. The computer-readable storage medium of claim 9, comprising:
determining whether the potential damage has exceeded a threshold depression value; and
indicating the transport is damaged when the threshold depression value is exceeded.

11. The computer-readable storage medium of claim 8, comprising:
updating the transport condition profile with the actual damage; and
updating the rating of the user profile.

12. The computer-readable storage medium of claim 11, comprising:
creating a user review comprising the deducted rating of a user profile associated with the updated transport condition profile.

13. The computer-readable storage medium of claim 8, comprising:
responsive to the indication of the potential damage, retrieving a smart contract from a distributed ledger; and
identifying, from the smart contract, one or more sensors required to collect sensor data at the time of the potential damage.

14. A system, comprising:
a transport; and
a server configured to:
indicate potential damage to an interior of the transport, wherein the potential damage is stored in a temporary transport profile;
compare the temporary transport profile to a transport condition profile that includes an initial condition of the transport to determine an actual damage to the interior of the transport; and
deduct a rating of a user profile associated with the transport based on the actual damage.

15. The system of claim 14, wherein the server is configured to:
indicate potential damage to an exterior body of the transport;
identify an exterior transport body sensor that indicates a potential damage to an exterior body of the transport;
store the potential damage indicator to the exterior body in the temporary transport profile;
compare the temporary transport profile to the transport condition profile; and
determine whether any damage to the exterior body has been damaged based on the comparison.

16. The system of claim 15, wherein the server is configured to:
determine whether the potential damage has exceeded a threshold depression value; and
indicate the transport is damaged when the threshold depression value is exceeded.

17. The system of claim 14, wherein the server is configured to perform at least one of:
update the transport condition profile with the actual damage; and
update the rating of the user profile.

18. The system of claim 17, wherein the server is configured to:
create a user review comprising the deducted rating of a user profile associated with the updated transport condition profile.

19. The system of claim 14, wherein the server is configured to:
responsive to the indication of the potential damage, retrieve a smart contract from a distributed ledger; and
identify, from the smart contract, one or more sensors required to collect sensor data at the time of the potential damage.

20. The system of claim 19, wherein the server is configured to:
create a blockchain transaction to identify whether the transport is damaged at the time of the potential damage, based on a comparison of indicated potential damage to one or more thresholds.

* * * * *